US009591362B2

(12) United States Patent
Incertis Carro

(10) Patent No.: US 9,591,362 B2
(45) Date of Patent: Mar. 7, 2017

(54) SYSTEM AND METHOD FOR ENHANCING RECORDED RADIO OR TELEVISION PROGRAMS WITH INFORMATION ON THE WORLD WIDE WEB

(71) Applicant: YAHOO! INC., Sunnyvale, CA (US)

(72) Inventor: Fernando Incertis Carro, Valencia (ES)

(73) Assignee: YAHOO! INC, Sunnyvale, CA (US)

( * ) Notice: Subject to any disclaimer, the term of this patent is extended or adjusted under 35 U.S.C. 154(b) by 0 days.

(21) Appl. No.: 15/156,299

(22) Filed: May 16, 2016

(65) Prior Publication Data

US 2016/0286271 A1    Sep. 29, 2016

Related U.S. Application Data

(63) Continuation of application No. 14/029,429, filed on Sep. 17, 2013, now Pat. No. 9,344,670, which is a (Continued)

(30) Foreign Application Priority Data

May 10, 2001 (EP) .................................... 01480032

(51) Int. Cl.
*H04N 21/435* (2011.01)
*H04N 21/462* (2011.01)
(Continued)

(52) U.S. Cl.
CPC ....... *H04N 21/4622* (2013.01); *G11B 27/322* (2013.01); *H04N 5/765* (2013.01);
(Continued)

(58) Field of Classification Search
CPC combination set(s) only.
See application file for complete search history.

(56) References Cited

U.S. PATENT DOCUMENTS 6,748,421 B1 * 6/2004 Ozkan .................. G06F 3/0481
  348/E7.085
7,984,472 B2 * 7/2011 Incertis Carro ..... G11B 27/322
  725/112

* cited by examiner

*Primary Examiner* — Kieu Oanh T Bui
(74) *Attorney, Agent, or Firm* — James J. DeCarlo; Greenberg Traurig, LLP

(57) ABSTRACT

The present invention is directed to a system, method and computer program for enabling a user (100) (an auditor or a viewer) to access complementary information related to one or a plurality of sequences or topics of interest (102) in a recorded program (103) previously broadcast on the radio or television and played back on a device, such as an audio or video tape or disk recorder/player (104). The preferred embodiment of the invention relates to a system and method for enabling a person (100) listening to or watching a recorded program (103), to select one or a plurality of topics (101) (102) drawing his or her attention and for immediately receiving further information related to these topics from the World Wide Web. The system is based on the synchronization of local times (204) (205) of transmitters (201) and recorders (203). The flow of information transmitted, received and recorded is always synchronized, independently of the relative positions of recorders and transmitters. The synchronization is done referring to an absolute or universal time such as the Global Positioning System Time (GPS-time), the Global Orbiting Navigational Satellite System (GLONASS) time or another suitable universal time based on a satellite system. The GPS or GLONASS receivers are integrated or connected to the broadcasting stations. At the receiver side, GPS or GLONASS receivers may be integrated or connected to the audio or video recorders. The system is also based on a plurality of hyperlinks defined during the production and recording of the broadcast program, for given sequences corresponding to particular intervals of time synchronized with the universal (absolute) time.

(Continued)

Main Components of the Invention

The hyperlinks are associated with the information that is broadcast in the program. They can be selected by users during the playback of the recorded program during pre-defined intervals of time and activated to access additional information and services.

20 Claims, 22 Drawing Sheets

Related U.S. Application Data continuation of application No. 13/037,847, filed on Mar. 1, 2011, now Pat. No. 8,539,538, which is a continuation of application No. 10/476,921, filed as application No. PCT/EP02/04329 on Mar. 28, 2002, now Pat. No. 7,984,472.

(51) Int. Cl.
| | | |
|---|---|---|
| *G11B 27/32* | (2006.01) | |
| *H04N 5/92* | (2006.01) | |
| *H04N 7/173* | (2011.01) | |
| *H04N 21/242* | (2011.01) | |
| *H04N 21/433* | (2011.01) | |
| *H04N 21/434* | (2011.01) | |
| *H04N 21/45* | (2011.01) | |
| *H04N 21/4725* | (2011.01) | |
| *H04N 21/4782* | (2011.01) | |
| *H04N 21/84* | (2011.01) | |
| *H04N 21/858* | (2011.01) | |
| *H04N 5/765* | (2006.01) | |
| *H04N 5/91* | (2006.01) | |
| *H04N 5/775* | (2006.01) | |
| *H04N 21/472* | (2011.01) | |
| *H04N 21/482* | (2011.01) | |

(52) U.S. Cl.
CPC ............... *H04N 5/775* (2013.01); *H04N 5/91* (2013.01); *H04N 5/9201* (2013.01); *H04N 7/17318* (2013.01); *H04N 21/242* (2013.01); *H04N 21/4334* (2013.01); *H04N 21/4345* (2013.01); *H04N 21/4524* (2013.01); *H04N 21/472* (2013.01); *H04N 21/4725* (2013.01); *H04N 21/4782* (2013.01); *H04N 21/4821* (2013.01); *H04N 21/84* (2013.01); *H04N 21/858* (2013.01); *H04N 21/8586* (2013.01)

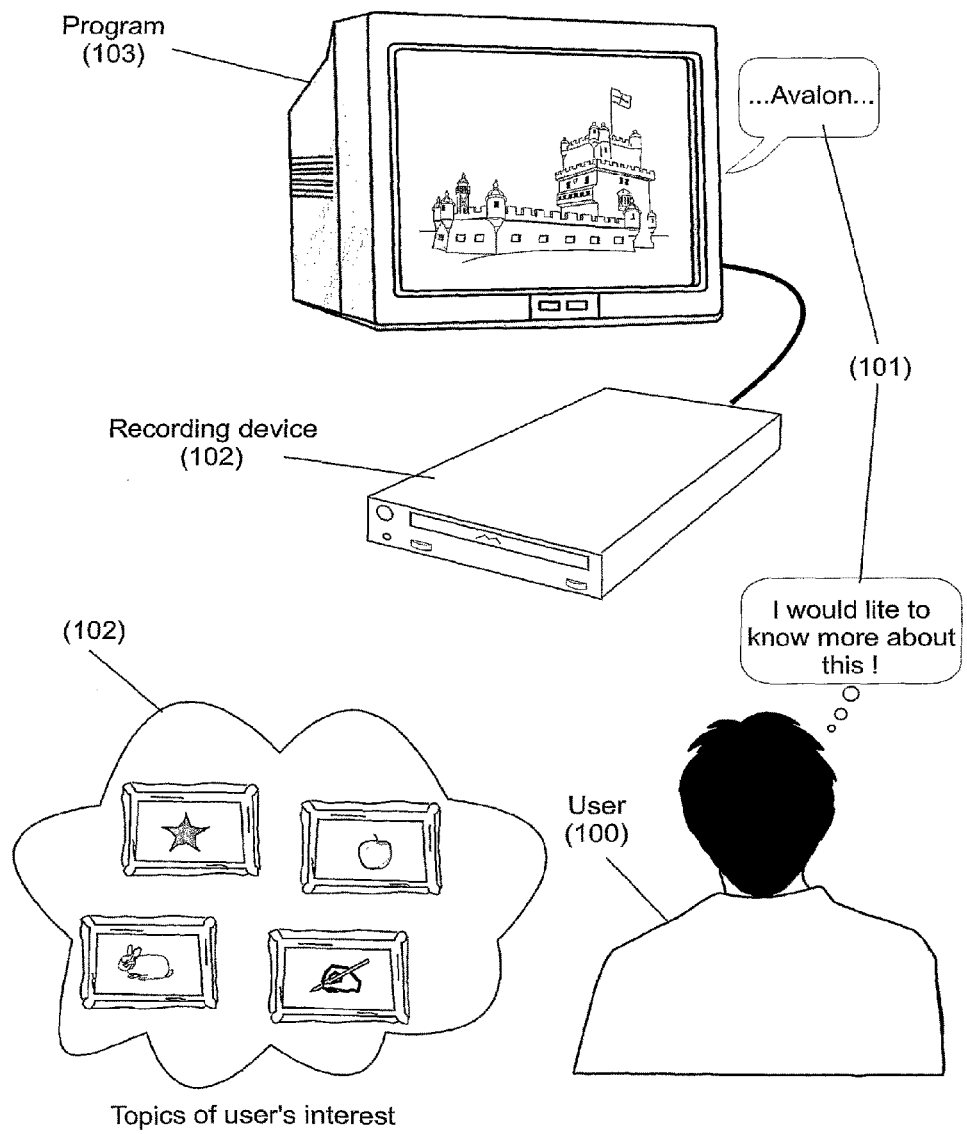
FIG. 1: Perception of interesting topics in a recorded program watched by a television viewer

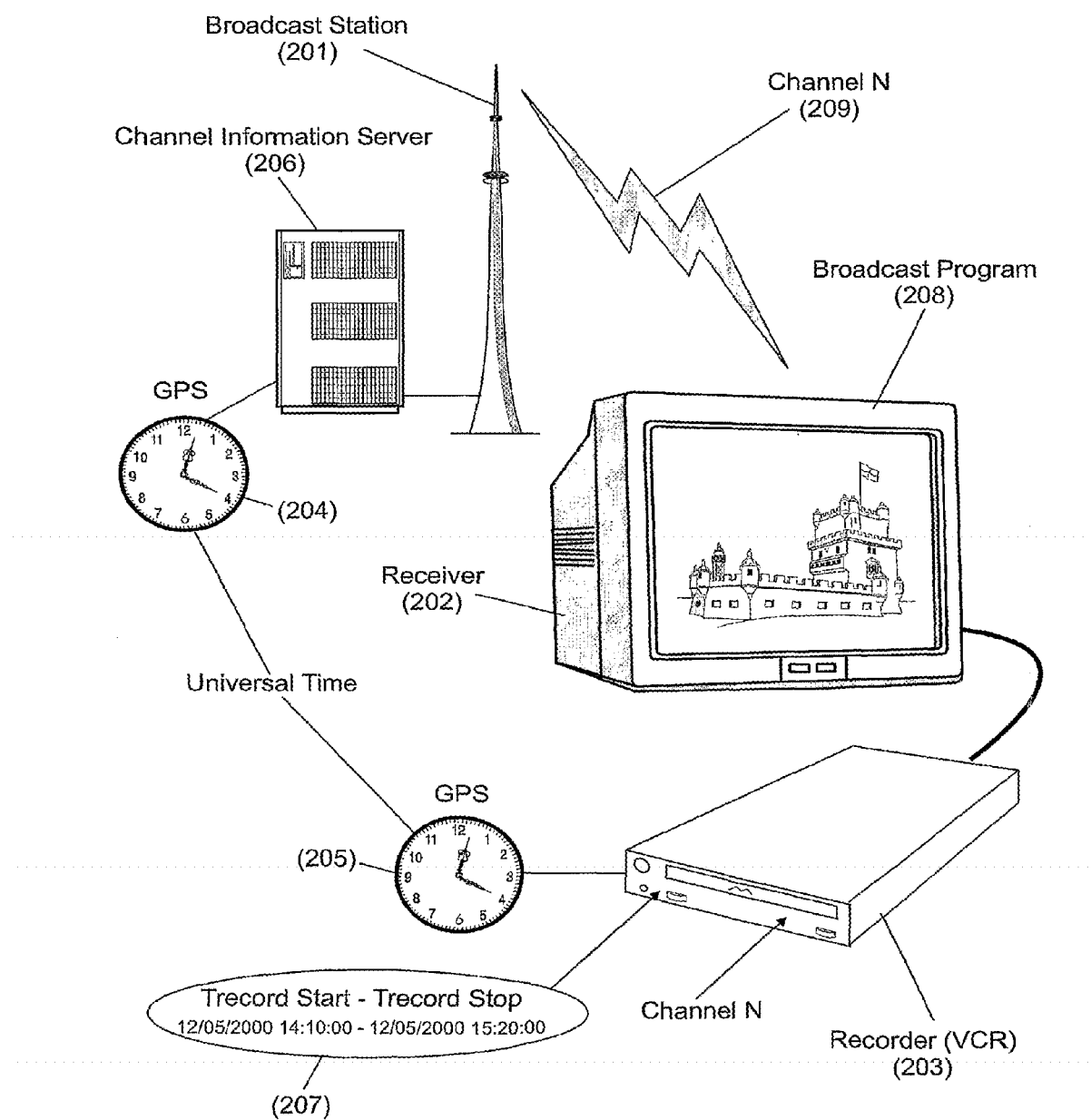
FIG. 2: Synchronization of transmitters and recorders

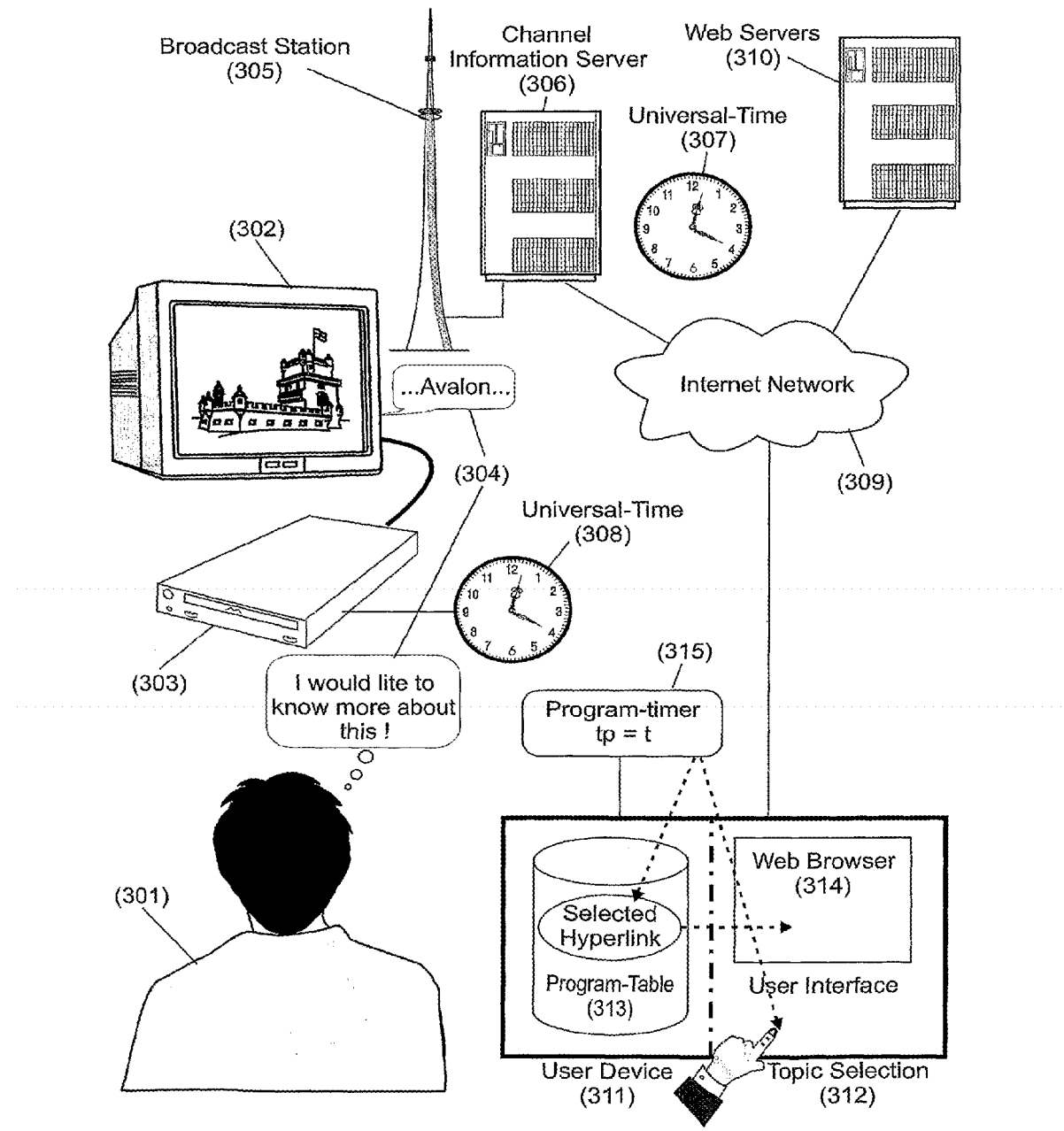
FIG. 3: Main Components of the invention

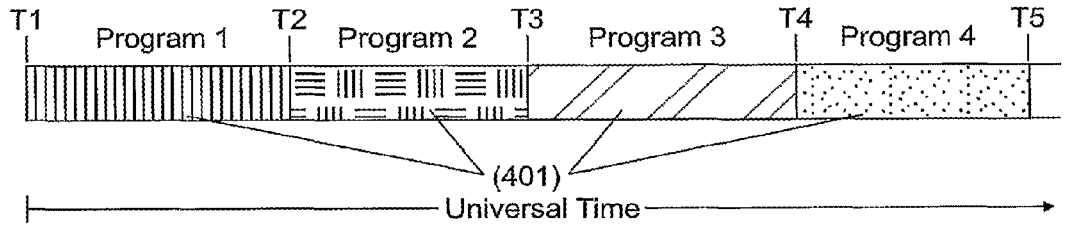
FIG. 4: Synchronization of Programs according to universal-time referenced intervals
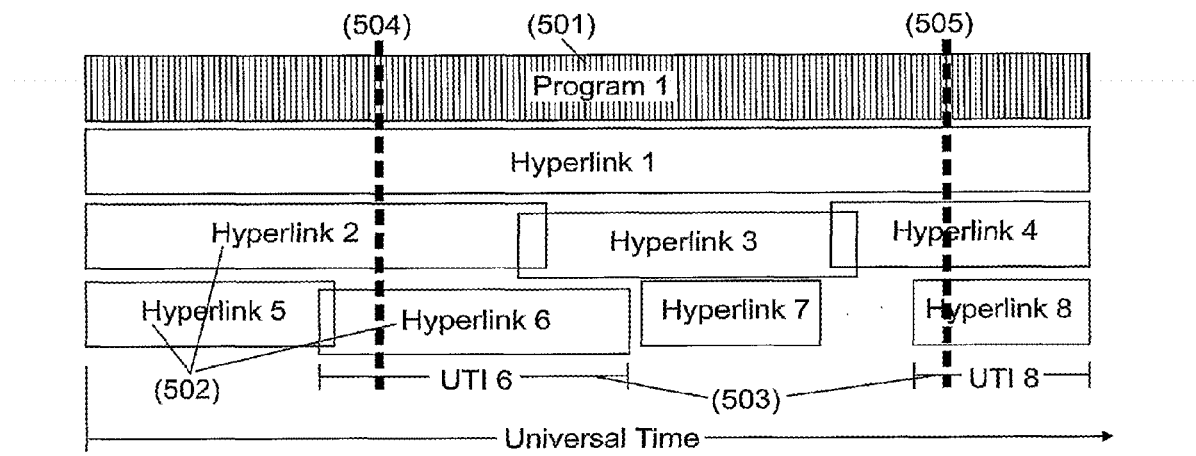
FIG. 5: Hyperlinks defined for the broadcast programs during universal-time intervals
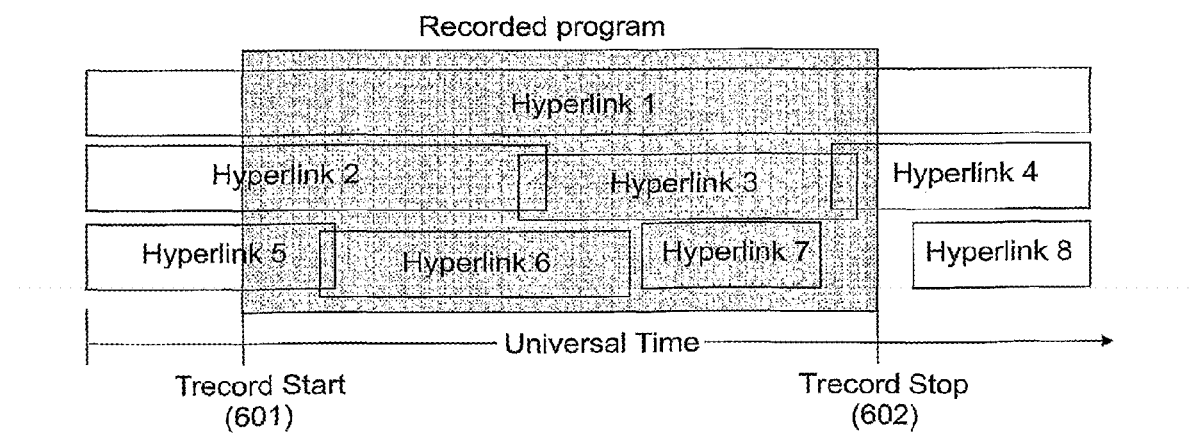
FIG. 6: Sequence of hyperlinks of a recorded program

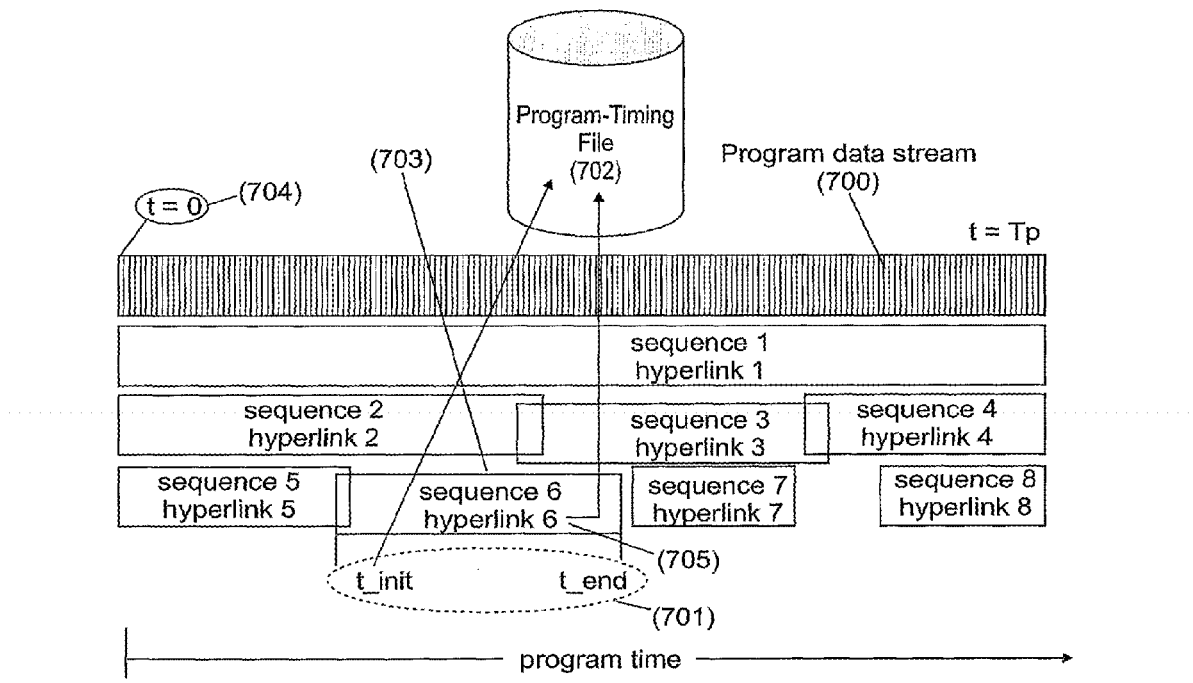
FIG. 7: Program Timing File of a program

| PROG TIME | (802) 4.587 secs | PROGRAM NAME: "Early British Kingdoms" (808) | PROGRAM URL: http://freespace.virgin.net/ (801) |
|---|---|---|---|
| From (sec): | To (sec): | Link Name: | URL: |
| 0 | 596 | Buelt & Gwerthrynion | http://freespace.virgin.net/david.ford2/buelt.html |
| 536 | 721 | Caer-Baddan (Bath) | http://freespace.virgin.net/david.ford2/south.html#Gloui |
| 566 | 1.715 | Caer-Celemion (Silchester) | http://freespace.virgin.net/david.ford2/vortigen.html |
| 1.535 | 2.092 | Ceredigion (803) | http://freespace.virgin.net/david.ford2/ceredigion.html (806) |
| 1.535 | 2.452 | Mabinogion | http://www.cyberphile.co.uk/~taff/taffnet/mabinogion/mabinogion.html |
| 2.392 | 3.597 | Avalon | http://freespace.virgin.net/david.ford2/avalon.html |
| 3.537 | 4.037 | Afallach | http://freespace.virgin.net/david.ford2/gods.html#Afallach |
| 3.720 | 3.973 | Beli Mawr | http://freespace.virgin.net/david.ford2/gods.html#Beli |
| 3.720 | 3.973 | St. Joseph of Arimathea | http://freespace.virgin.net/david.ford2/joseph.html |
| 3.840 | 4.259 | The Kings of Dumnonia (807) | http://freespace.virgin.net/david.ford2/dumnonia.html |
| 4.199 | 4.587 | Eudaf Hen & Conari Mer | http://freespace.virgin.net/david.ford2/eudanc.html |

(804) (805)

FIG. 8: Program Timing File of a program

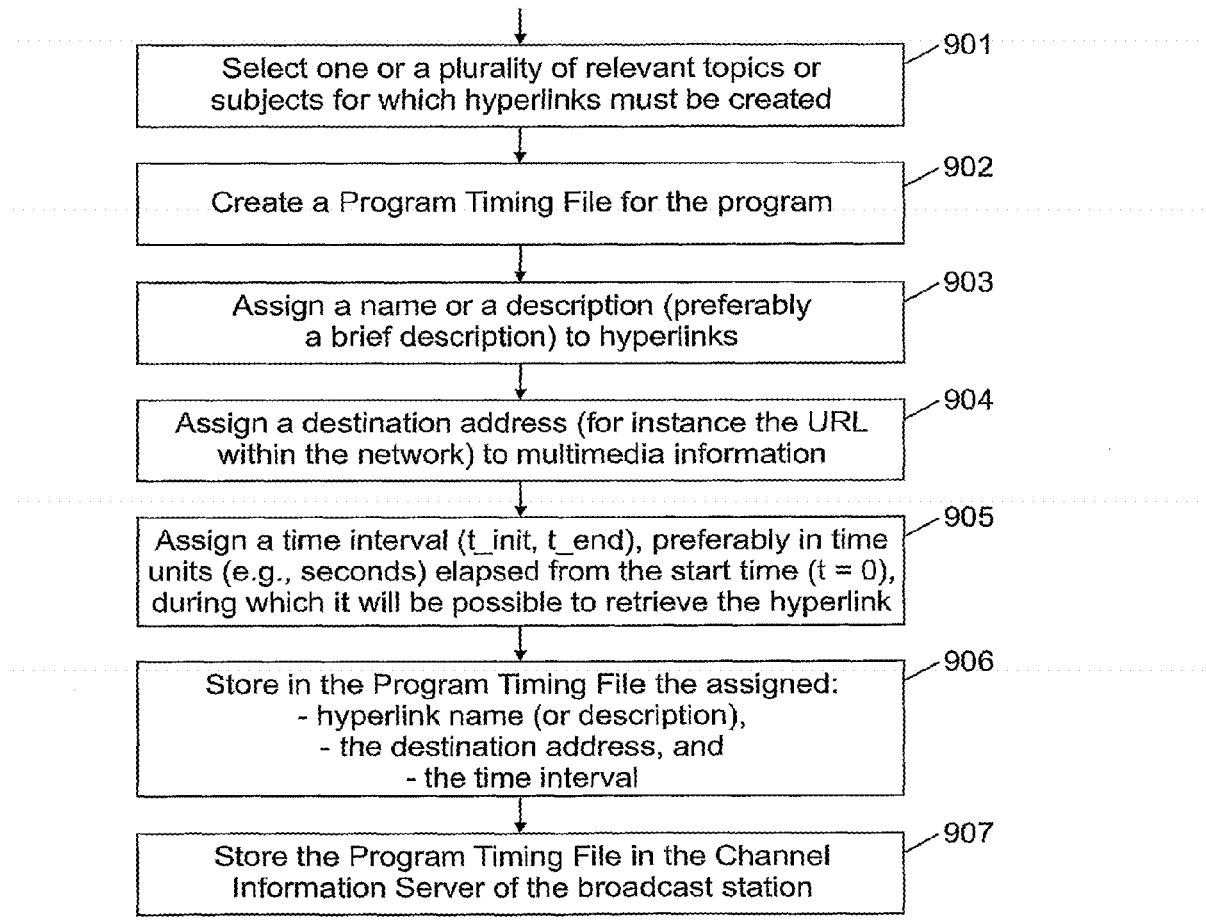
FIG. 9: Method for creating program timing files on servers

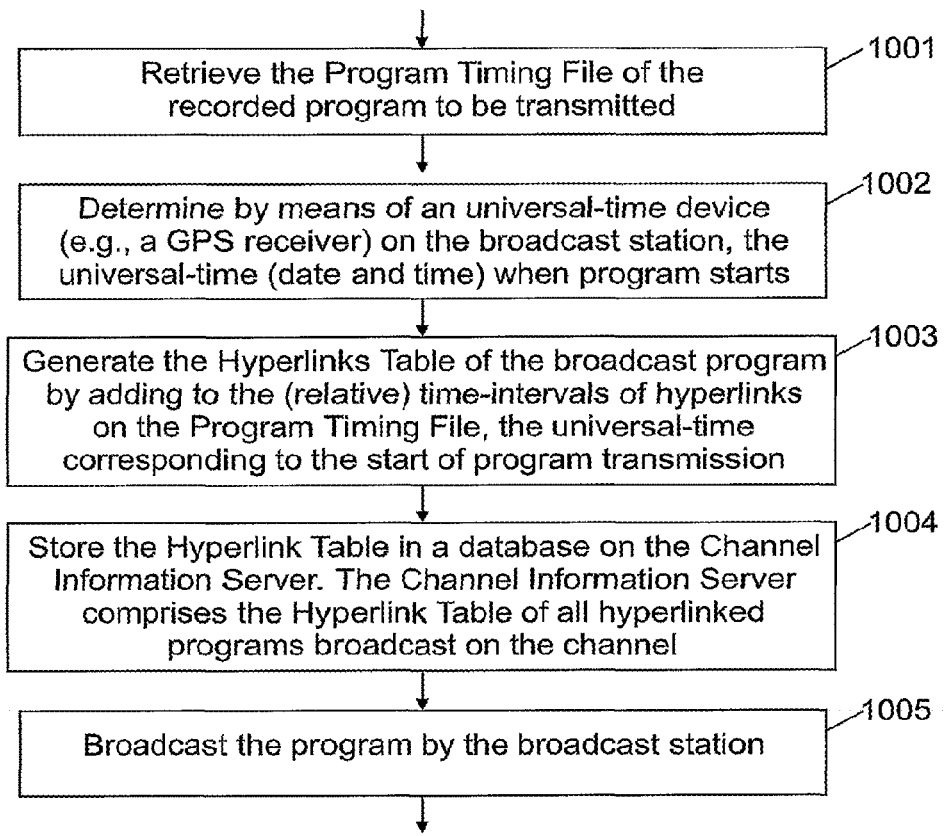
FIG. 10: Method for generating on servers Hyperlink Tables from Program Timing Files

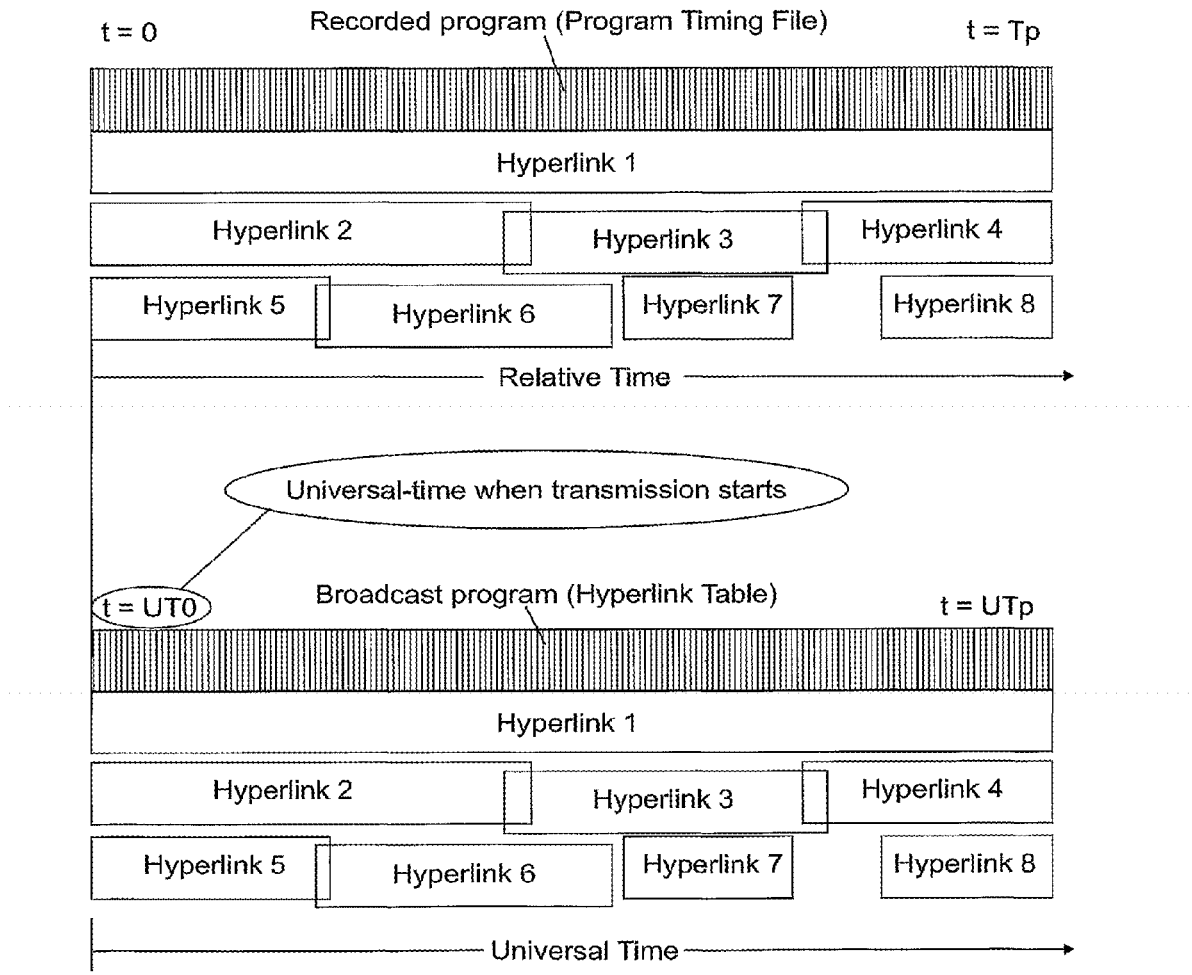
FIG. 11: Transformation of relative time intervals to universal-time referenced intervals at transmision time (1203) (1204) (1201)

| | | PROGRAM NAME:<br>"Early British Kingdoms" | PROGRAM URL:<br>http://freespace.virgin.net/ |
|---|---|---|---|
| From: | To: | Link Name: | URL: |
| 12/05/2000<br>14:10:51 | 12/05/2000<br>14:20:05 | Buellt & Gwerthrynion | http://freespace.virgin.net/david.ford2/buellt.html |
| 12/05/2000<br>14:19:05 | 12/05/2000<br>14:22:52 | Caer-Baddan (Bath) | http://freespace.virgin.net/david.ford2/south.htm#Gloui |
| 12/05/2000<br>14:20:17 | 12/05/2000<br>14:39:26 | Caer-Celemion (Silchester) | http://freespace.virgin.net/david.ford2/vortigen.html |
| 12/05/2000<br>14:36:26 | 12/05/2000<br>14:45:43 | Ceredigion | http://freespace.virgin.net/david.ford2/ceredigion.html |
| 12/05/2000<br>14:36:26 | 12/05/2000<br>14:51:43 | Mabinogion | http://www.cyberphile.co/~taff/taffnet/mabinogion/mabinogion.html |
| 12/05/2000<br>14:50:43 | 12/05/2000<br>15:10:48 | Avalon | http://freespace.virgin.net/david.ford2/avalon.html |
| 12/05/2000<br>15:09:48 | 12/05/2000<br>15:18:08 | Afallach | http://freespace.virgin.net/david.ford2/gods.html#Affalach |
| 12/05/2000<br>15:12:51 | 12/05/2000<br>15:16:22 | Beli Mawr | http://freespace.virgin.net/david.ford2gods.html#Beli |
| 12/05/2000<br>15:12:51 | 12/05/2000<br>15:16:22 | St.Joseph of Arimathea | http://freespace.virgin.net/david.ford2/joseph.html |
| 12/05/2000<br>15:14:51 | 12/05/2000<br>15:20:08 | The Kings of Dumnonia | http://freespace.virgin.net/david.ford2/dumnonia.html |
| 12/05/2000<br>15:19:08 | 12/05/2000<br>15:25:36 | Eudaf Hen & Conan Mer | http://freespace.virgin.net/david.ford2/eudanc.html |

(1202)

FIG. 12: Hyperlink Table of the broadcast program in the Channel Information Server

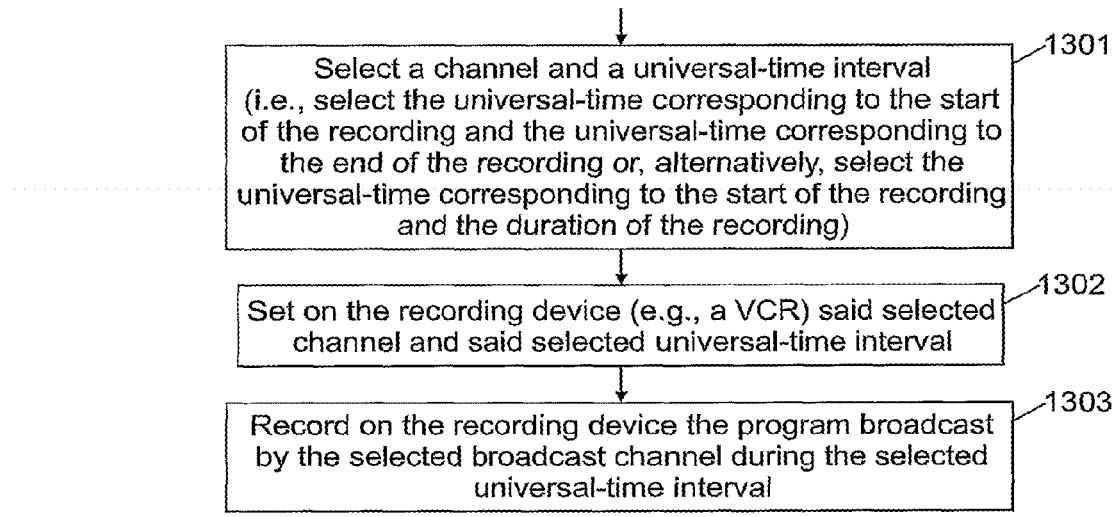
FIG. 13: Method for recording a broadcast program on the recording device

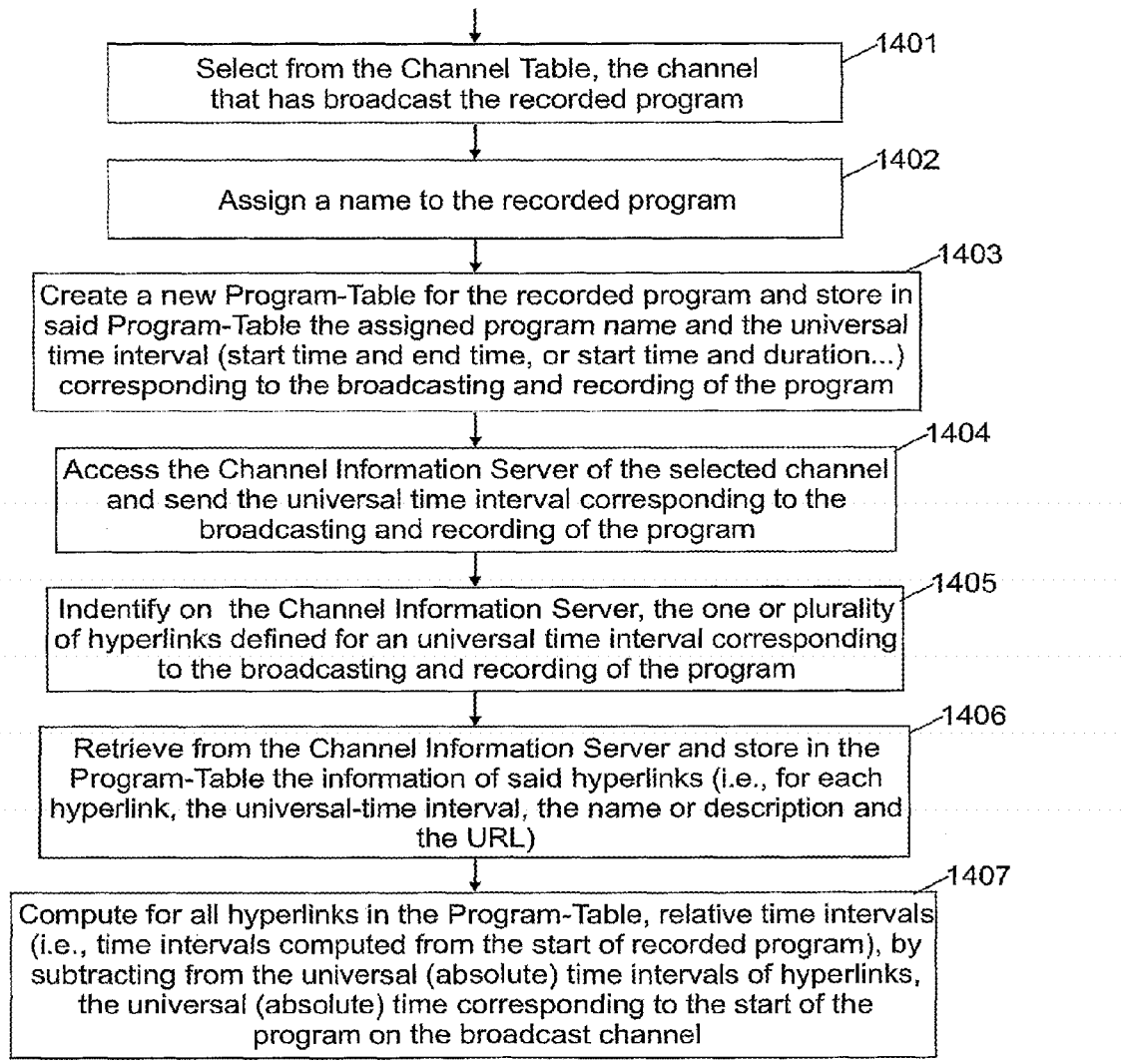
FIG. 14: Method for generating the Program-Table of a recorded program on the user device

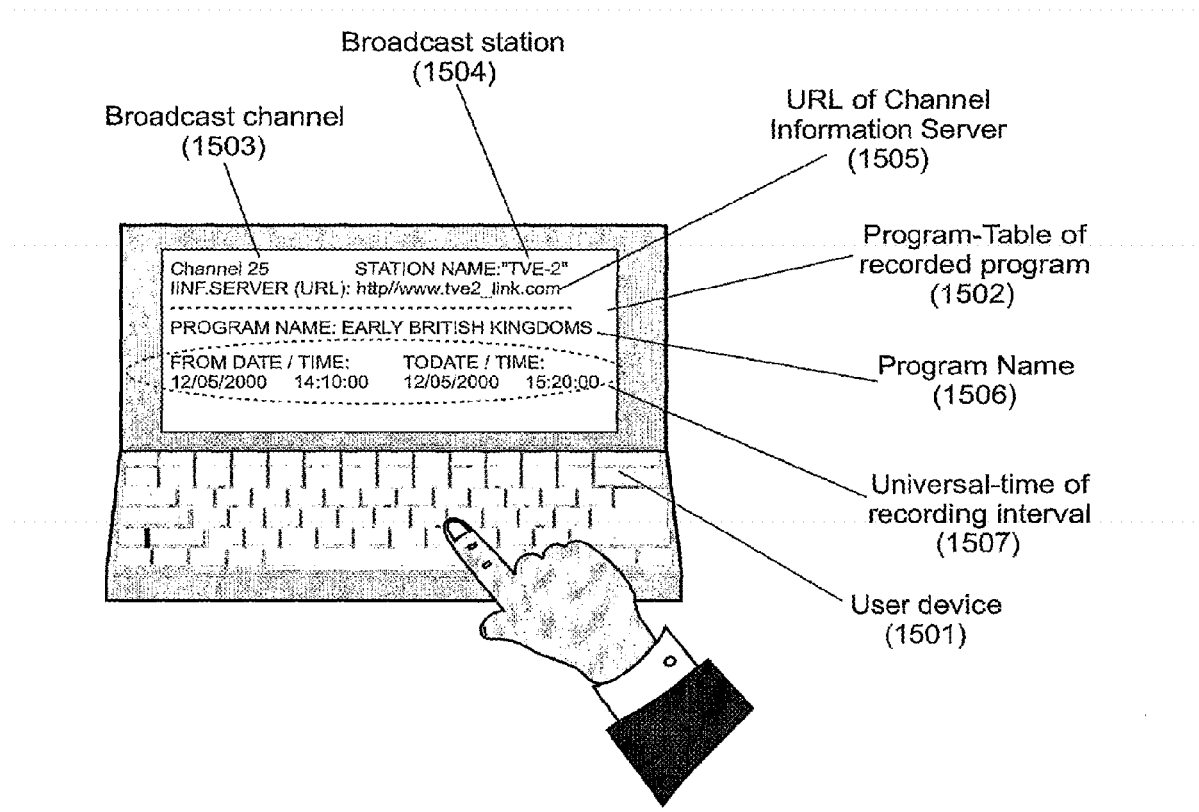
FIG. 15: Creation of a Program-Table for the selected channel

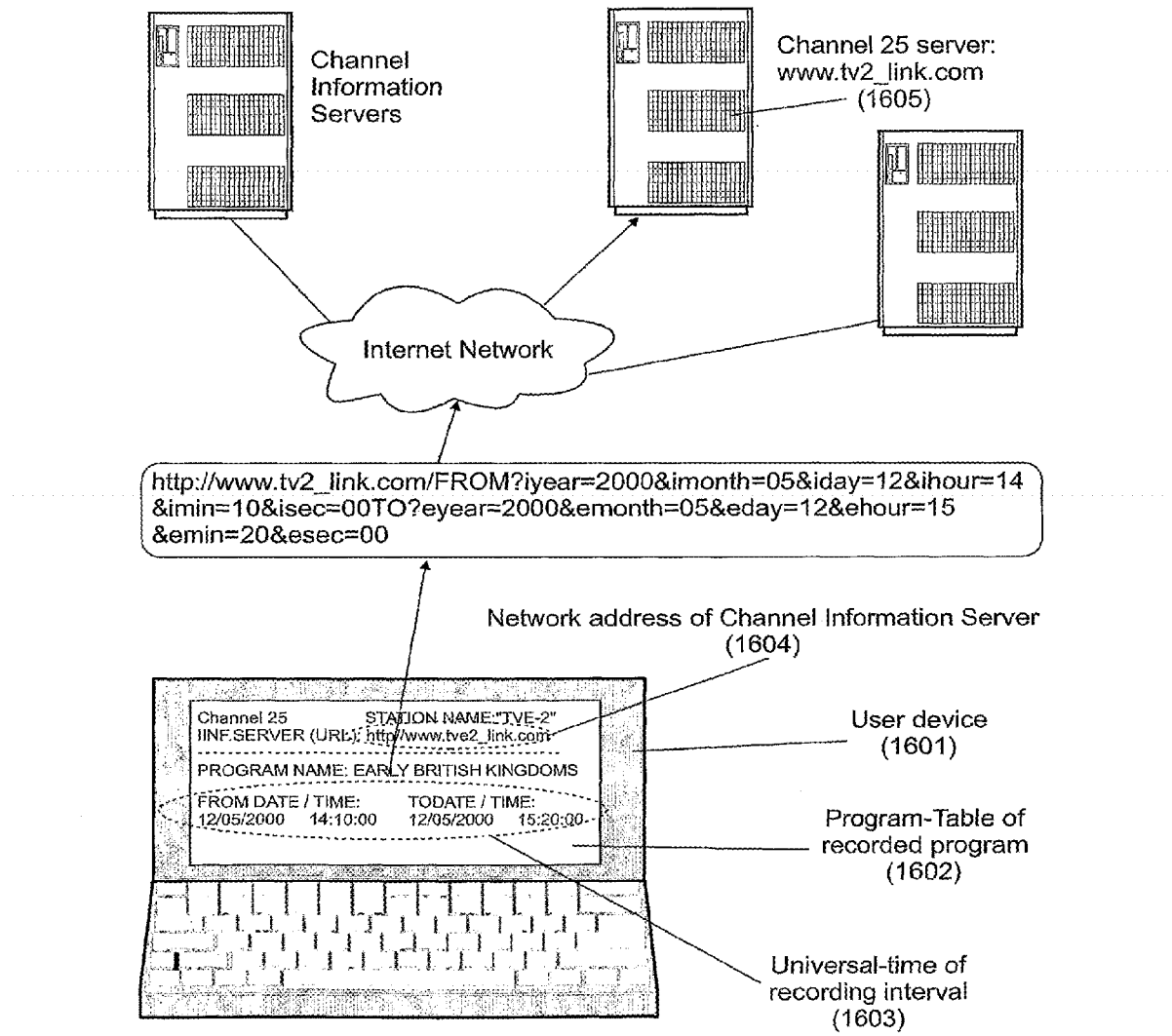
FIG. 16: Sending of the universal time interval corresponding to the recording of the program to the Channel Information Server

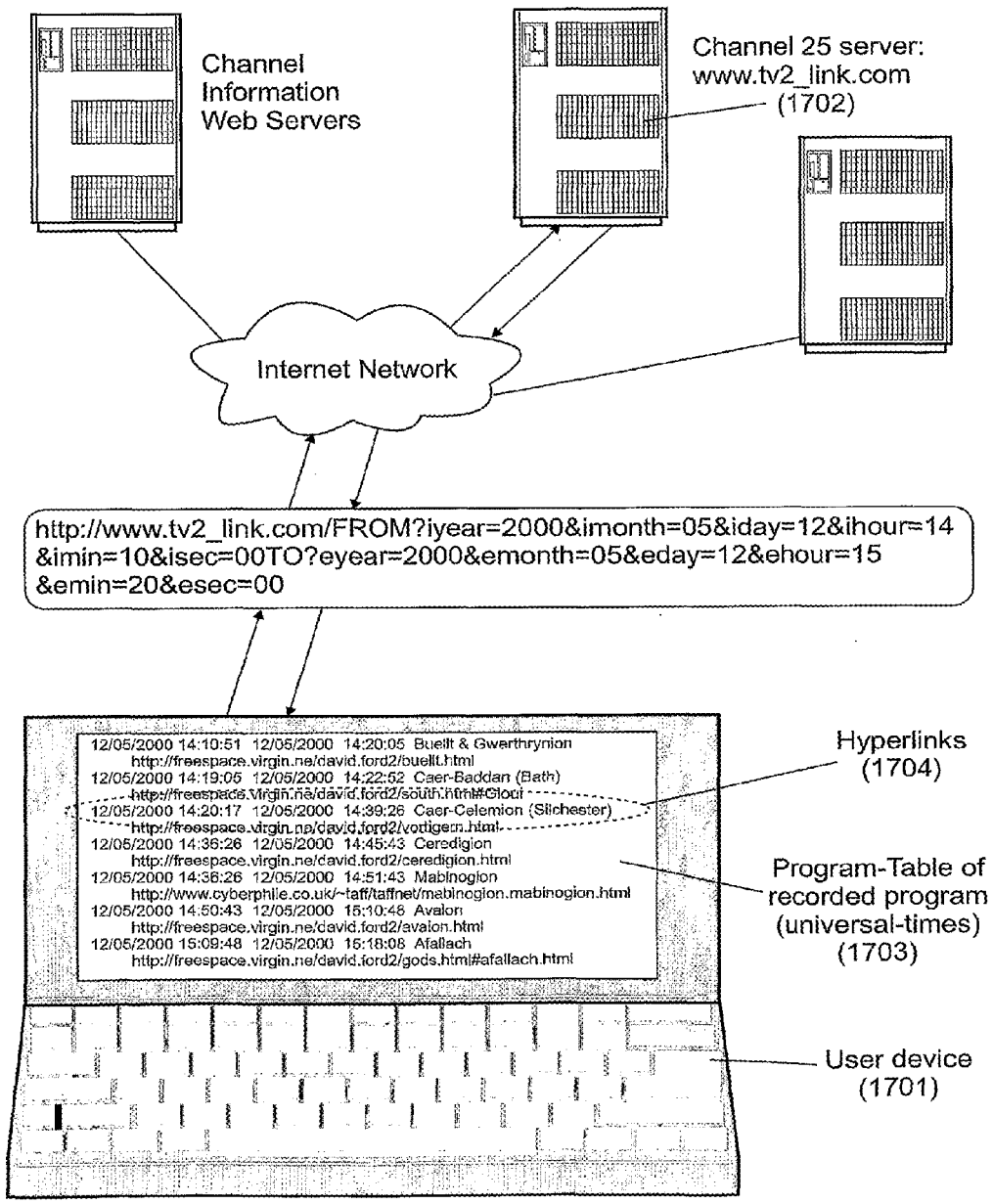
FIG. 17: Retrieval of the hyperlinks defined for the universal time intervals from the Channel Information Server

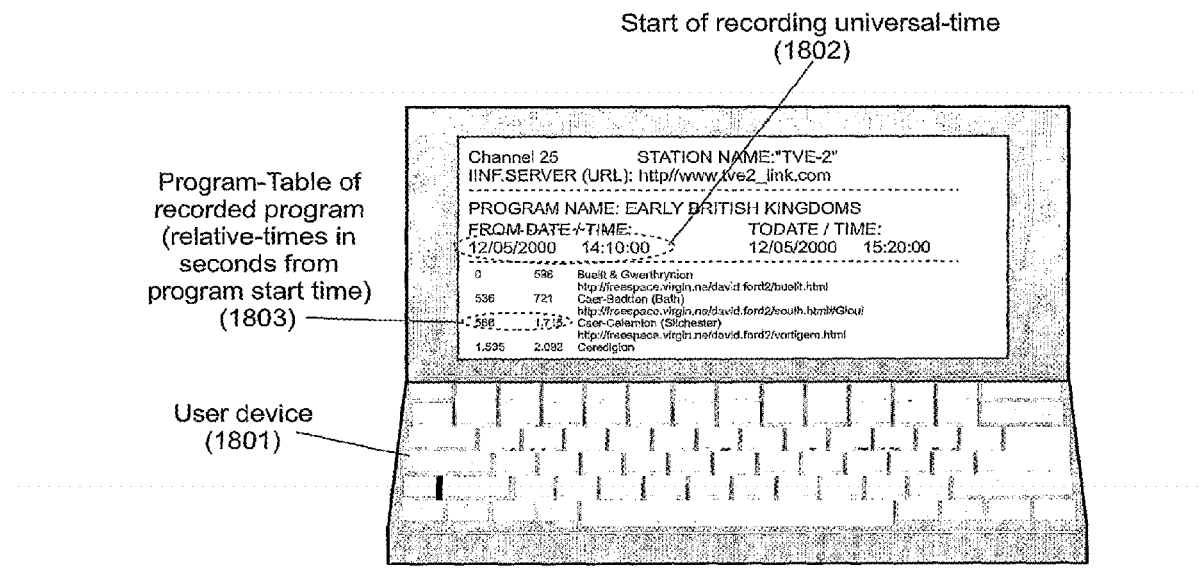
FIG. 18: Transformation of universal time intervals in relative time intervals

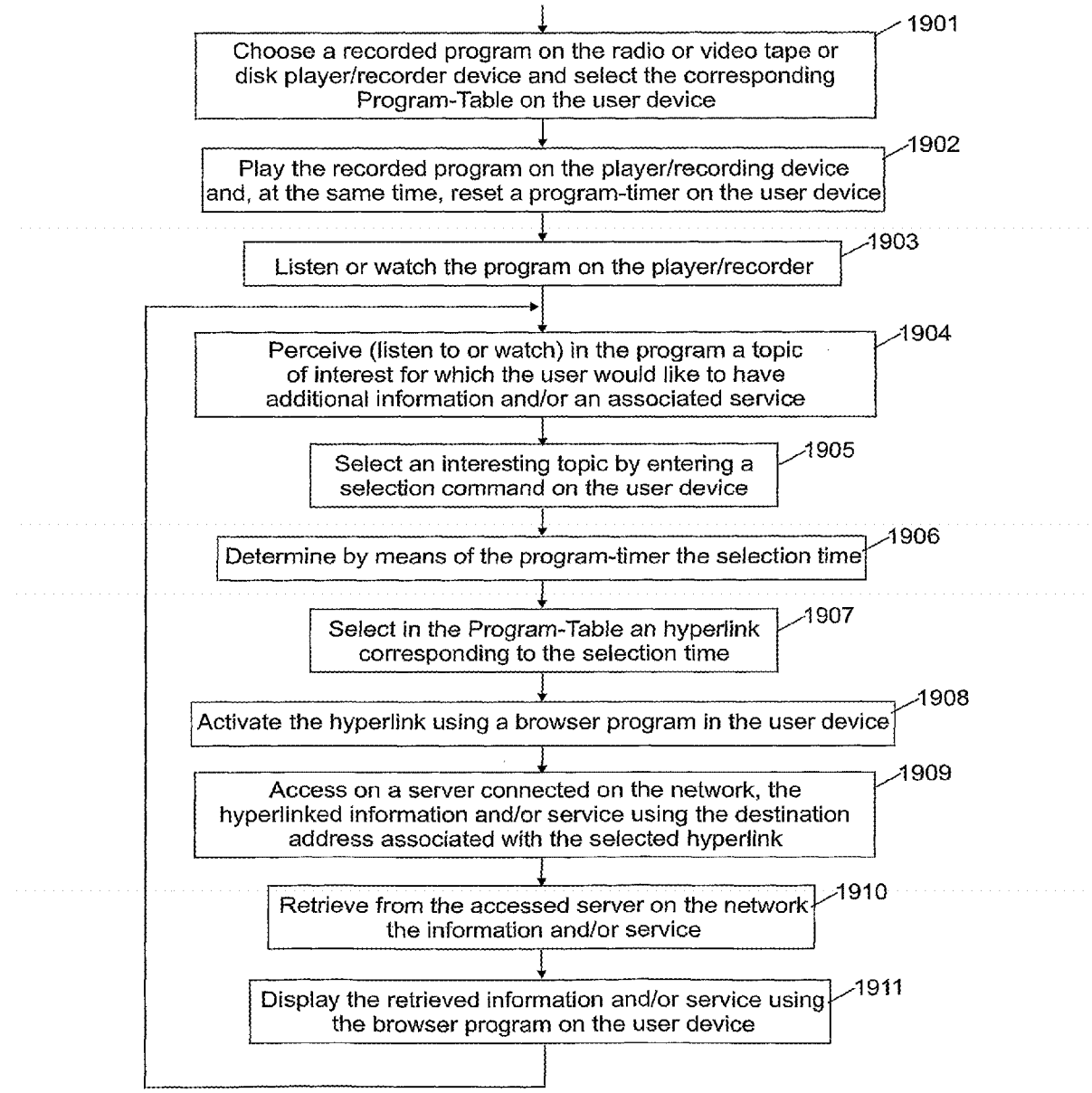
FIG. 19: Method for playing and for accessing information from a recorded program

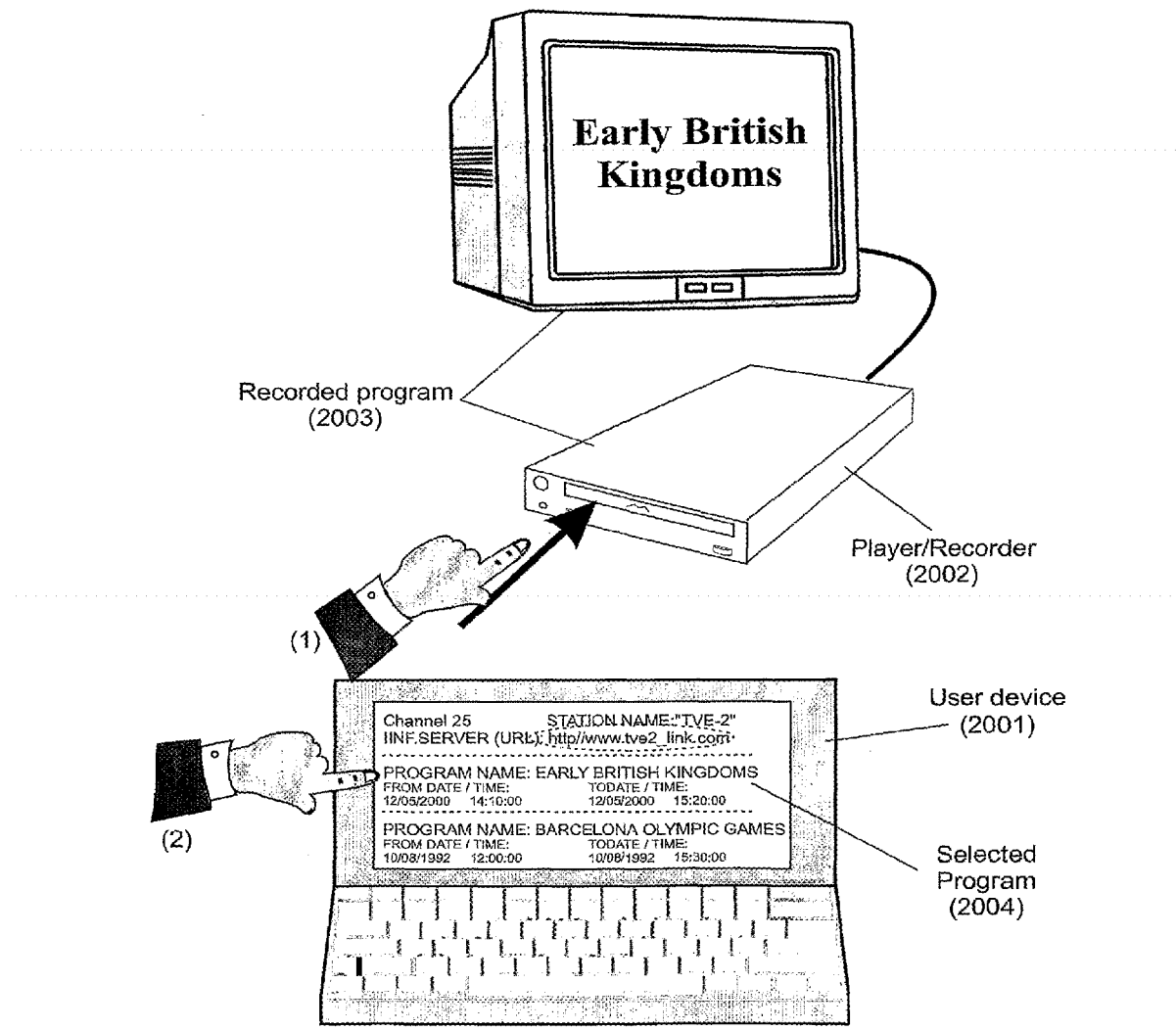
FIG. 20: Loading (1) of a recorded program on a player/recorder device and selection (2) of this program on the user device

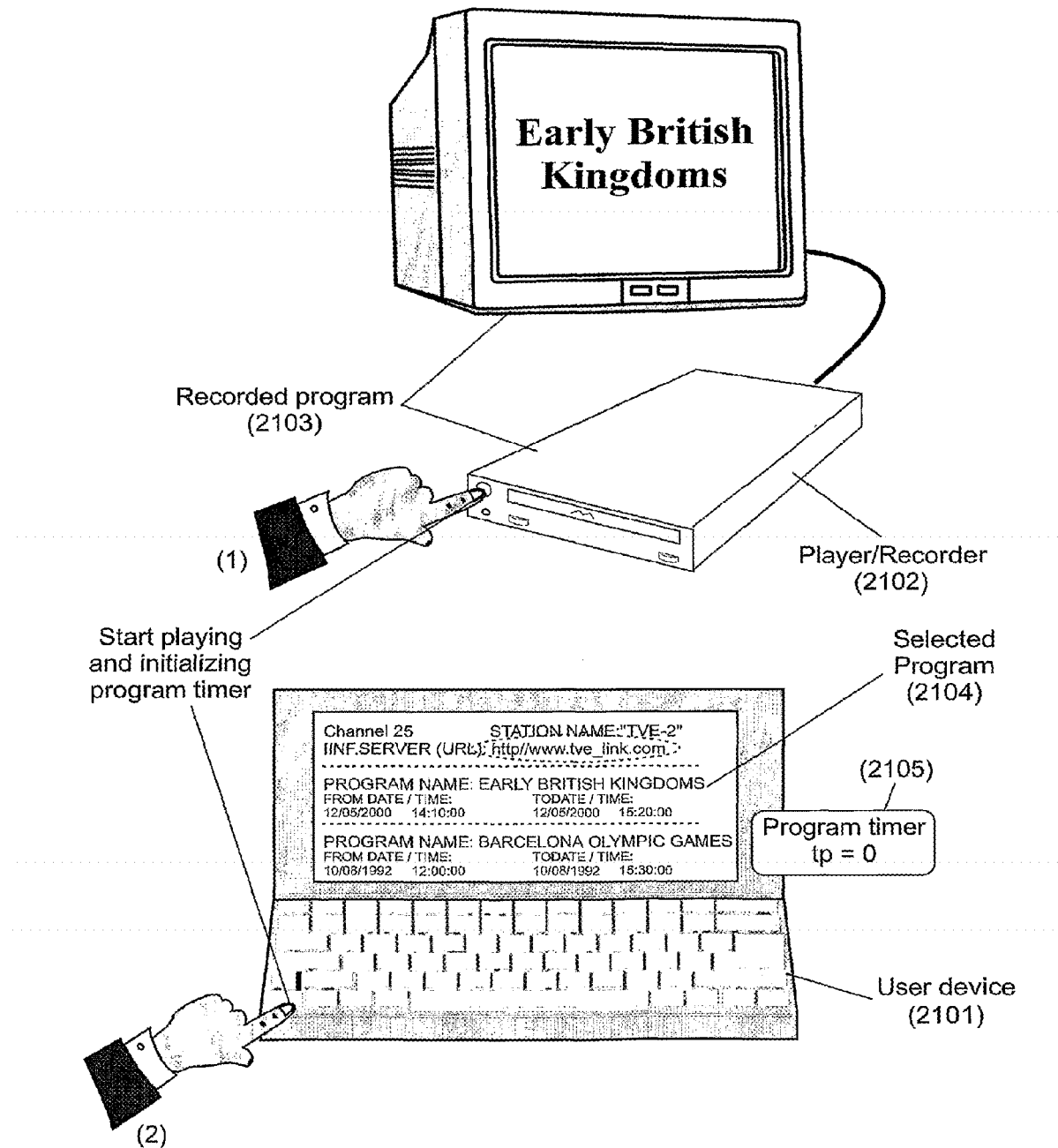
FIG. 21: Start (1) of the recorded program on the player/recorder device and start (2) of a program timer on the user device

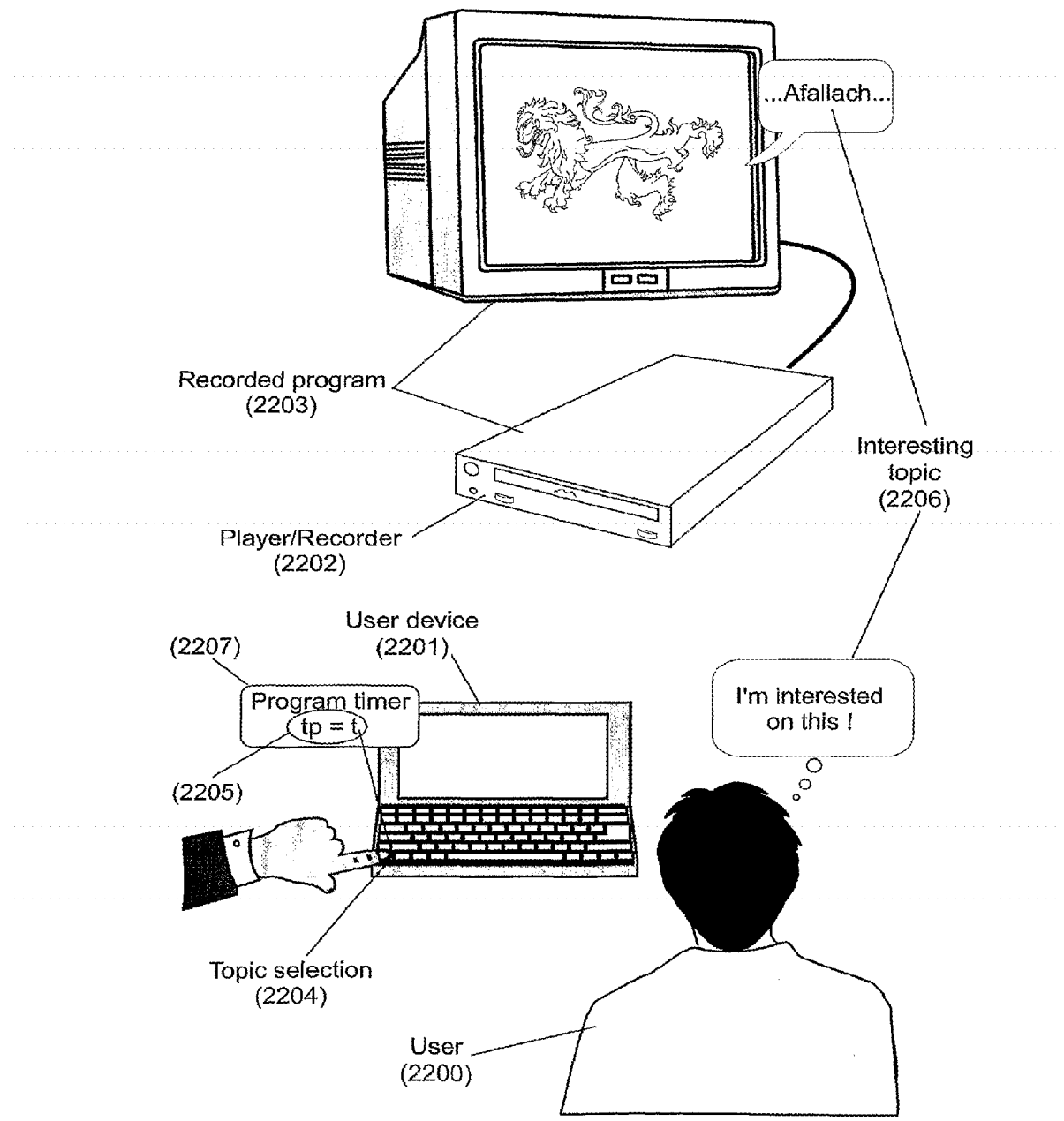
FIG. 22: Selection on a topic of interest and retrieval of the selection time on the program timer

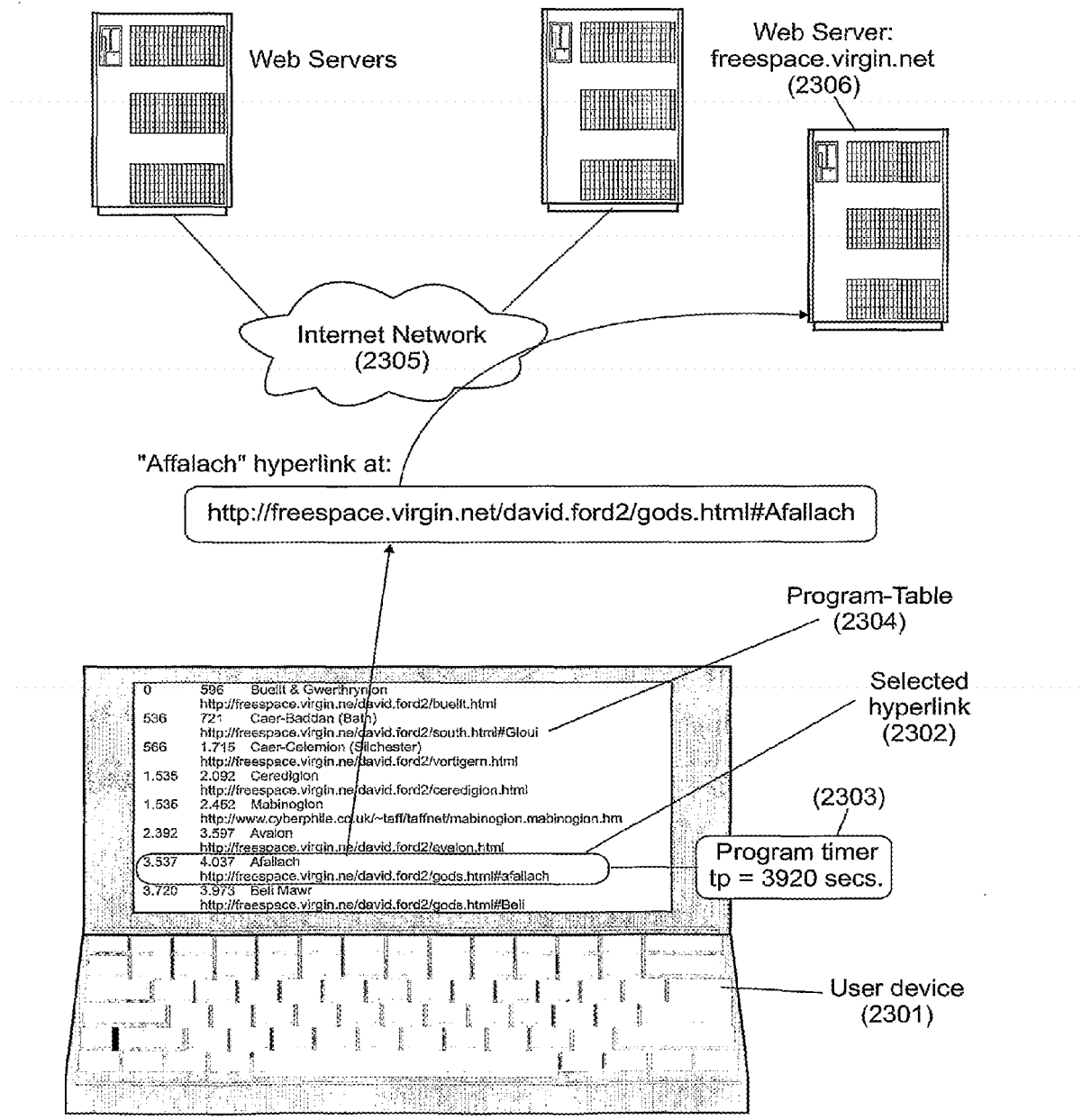
FIG. 23: Identification and activation of an hyperlink

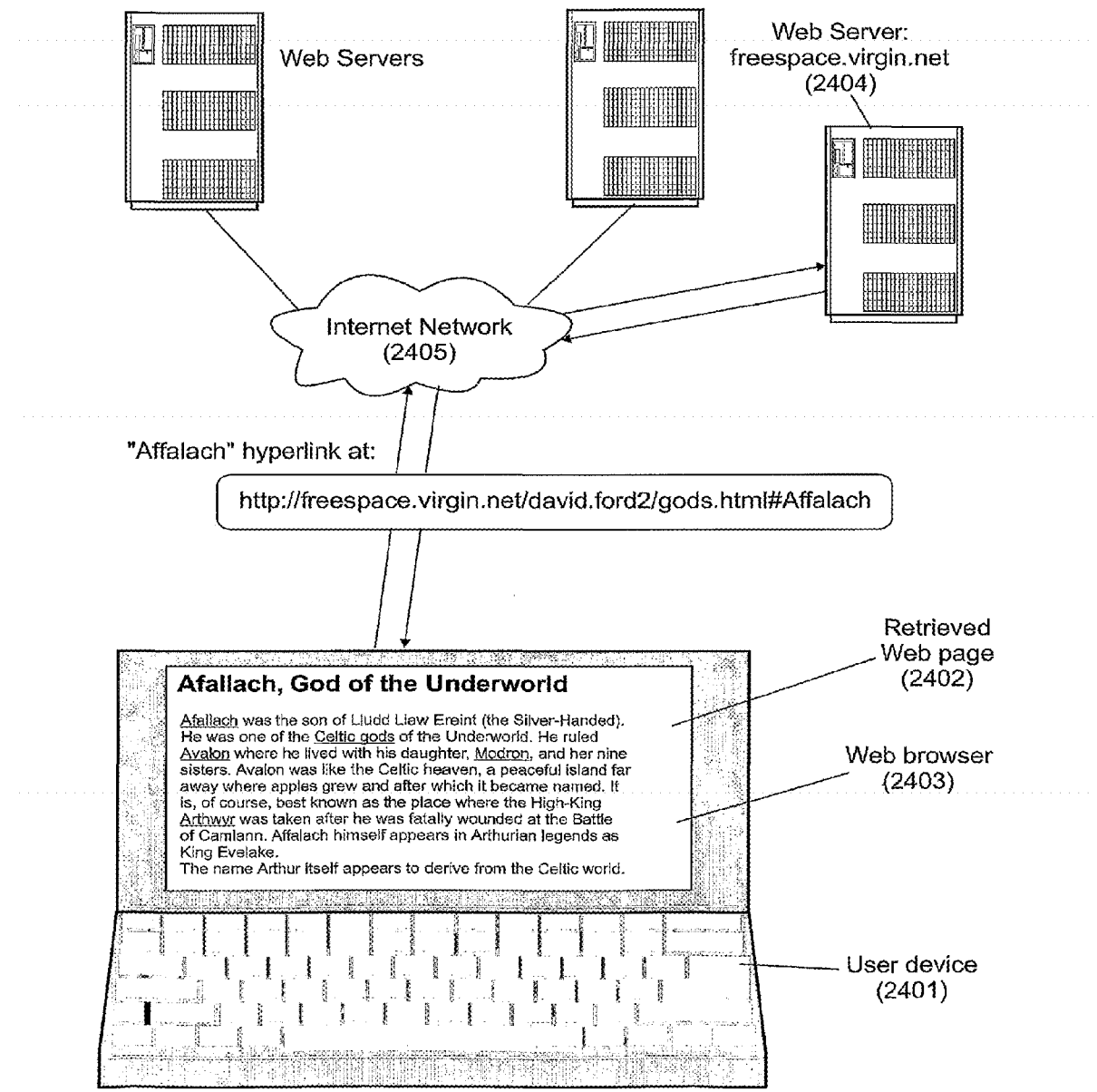
FIG. 24: Retrieval and display of the information hyperlinked with the selected topic

SYSTEM AND METHOD FOR ENHANCING RECORDED RADIO OR TELEVISION PROGRAMS WITH INFORMATION ON THE WORLD WIDE WEB

This application is a continuation of and claims the benefit of U.S. Pat. No. 9,344,670, filed on Sep. 17, 2013, which is a continuation of U.S. Pat. No. 8,539,538, filed on Mar. 1, 2011, which is a continuation of U.S. Pat. No. 7,984,472, filed on Oct. 31, 2003, which is a national stage application of and claims priority from PCT Application PCT/EP02/004329, filed Mar. 28, 2002, which claims priority from European Application No. 01480032.0, filed May 10, 2001, all of which are hereby incorporated by reference herein in their entirety.

FIELD OF THE INVENTION

The present invention relates generally to techniques for integrating broadcast and computer systems, and more particularly to a system and a method for enhancing recorded radio or television programs with information on the World Wide Web.

BACKGROUND OF THE INVENTION

New electronic communication technology is transforming societies all over the globe. In a digital world of high bandwidth and massive computing power, there is a substantial interest today for converging computing, telecommunications, broadcast radio and television with the World Wide Web.
Broadcasting Media consumers have a need for additional services. When people watch live or recorded television programs, they would like to have access to related complementary data, such as stocks and products prices, traffic and weather conditions, athletic records on Olympic Games or updated football scores. The complementary information associated with an on-line or a recorded broadcast program may consist of the biography of a player in a football match, an historical background on events cited on a news program or the recipe of an apple cake on a cooking show. Many organizations today want to store and manipulate audiovisual interactive data. For example, companies, schools, colleges, and universities have a need to store course lectures, demonstrations, simulations, and other interactive courseware on-line.

On the providers side, new sources of profit are expected by enhancing and extending the quantity and quality of services and information that is provided or that is made accessible to auditors or viewers of television or radio programs.

On the media consumer side, people are looking for more information or data about what they hear or view in programs recorded from live radio or television transmissions.

To provide these services from one-way broadcast programs recorded on conventional recorders—such as are conventional audio or video cassette recorders (VCRs)—, the problem is that people have no means to interact directly with the recorded programs to seek additional information or services.
On-Line Services on the Web In our society, independently of the massive development of radio and television, on-line services such as those provided by the World Wide Web (i.e., the Web) have rapidly emerged and are now widely available. Such on-line services based on the Internet provide access to a huge amount of information on an interactive basis. The Internet is a global network of computers. The Internet connects computers based on a variety of different operating systems or languages using a language referred to as TCP/IP ("Transmission Control Protocol/Internet Protocol"). With the increasing size and complexity of the Internet, tools have been developed to help find information on the network, often called "navigators" or "navigation systems". The World Wide Web ("WWW" or "the Web") is a recent superior navigation system. The Web is:

an Internet-based navigation system,
an information distribution and management system for the Internet, and
a dynamic format for communicating on the Web.

The Web integrates images, text, audio and video. A user on the Web using a graphical user interface can transparently communicate with different computers on the system, and different system applications, and different information formats for files and documents including, for example, text, sound and graphics.

Internet and the Web is transforming our society. They offer to millions of users the opportunity to access and exchange information and to communicate between each other. Currently, on-line systems on the Web offer a variety of different services to users, for instance, private message services, electronic commerce, news, real-time games, access to electronic databases, electronic newsletters, business-to-business transactions, or job placement services. But, even if such on-line services are now available, the searching and finding of the relevant information on the Web remains an arduous task, sometimes taking hours, even for experienced users.

Internet is essentially an open, multi-point to multi-point network, where each user can select and retrieve different information from many different servers. Today, most on-line interactions with the Web occur merely through textual inputs for instance by entering URLs (Uniform Resource Locator) names, by entering search words on search tools, by activating textual hyperlinks on HTML (Hypertext Markup Language) documents. Even if in a near future, the development of audiovisual interfaces (e.g., human speech interfaces, Web-phone integration) will render textual inputs less and less dominant in on-line environments, there is a good chance that the Web remains user unfriendly due to its massiveness, its lack of organization, and its randomness. Simply stated, in the Web there is no order or direction. Information remains most of the time hard to find and, even worse, in a foreseeable future, it will remain a difficult task to find the required information into the desired context.
Interactive Television and WebTV There is an advantage on providing useful complementary Web information in the context of a live or recorded broadcast program. On another side, the use of television sets as a terminal for accessing the Web is increasing every year. The consequence of this development is the integration of Web and television by transmitting along with a video signal a Web page showing for example statistics related to a player during a sports game.

The integration of television and Web, widely known as WebTV, has been made possible by the arrival of digital television. The data processing technology and the transmission technology used for the television and the Web are converging. Now television sets are more and more "intelligent", and this intelligence requires the upgrading of hardware in particular for supporting the Web functions. In fact, many of the services associated with WebTV are available today on the Web.

The most obvious trend for the Web on television (i.e., the WebTV) is to integrate the Web in the broadcast and cable television. The most important point of design is to know what program the user is watching. In this regard today, WebTV works with selected television producers to provide hyperlinks during programs or commercials. These hyperlinks are used to access additional information concerning the television programs through the WebTV service.

In the effort for converging interactive services and media, a consortium of communication companies promotes a set of standards for interactive television and WebTV known as "enhanced television". For example, the Advanced Television Enhancement Forum (ATVEF) is a cross-industry alliance of companies in the field of cable networks, radio and television, consumer electronics, and personal computers. This alliance of companies has defined some protocols for a television based on the Hypertext Markup Language (HTML) to allow content creators to deliver enhanced programs over all forms of transport (analog, digital, cable, and satellite) to any "intelligent" receiver. The ATVEF group is committed to accelerate the creation and distribution of enhanced television programs so that consumers can receive programs in the least expensive and most convenient possible way. Details on the ATVEF are available at: http://www.atvef.com.

Despite its considerable support (e.g., Disney, CNN, NBC, Intel, Deutsche Telecom, Nokia, iXL, set-top boxes manufacturer Pace Micro, and Microsoft, among other), the ATVEF standards are not the only standards for interactive television and WebTV. A wide array of standards such as the U.S.-based Advanced Television Systems Committee and Digital Video Broadcasting in Europe are looking into issues such as, for example, how to advance TV through the use of Sun Microsystem's Java language. Sun Microsystems who owns the OpenTV, is among these who haven't signed on to ATVEF standards, in contrast with Microsoft, one of the founders of the ATVEF effort. OpenTV is emphasizing the use of Java in television systems to address the issue of making enhanced TV services available across multiple devices. While ATVEF focuses on the display of content on multiple platforms, JavaTV, the software sponsored by OpenTV, focuses on hardware compatibility.

There are other standardization efforts which can potentially have an effect on the market. For example CableLabs, the industry's research consortium, attempts to set hardware and software standards to enable the execution of applications on any platform. W3C, the Internet User's Consortium, has initiated a forum involving the television community and the Internet community. The theme is "Real-Time Multimedia and the Web". The technologies that may be adopted by the ATT company may also influence the future market trends.

With so many ongoing initiatives, the problem is that today many people in the broadcast industry don't really know which direction the market is going. Quoting Jonathan Taplin, Intertainer's co-chief executive: "We believe the history of interactive TV is just about to be written. What we need is a common language to write to".

Also, in an article on Jun. 17, 1999, on CNET News.com, entitled "Rivalries, technologies confuse set-top marker", Jim Davis summarized the situation as follows: "Despite the homilies and Industrial Age metaphors espoused at a big cable convention here, (in Chicago) many roadblocks stilt stand in the way of mass use of the new TV set-top boxes, interactive television, and other services".

More recently, articles like the one entitled: "Will interactive internet television become a two-headed monster?", by Gary Chapman, published on the Technology section of the Tribune Media Services, Copyright© 2001 Nando Media, Copyright© 2001 Los Angeles Times Syndicate, dated on Mar. 29, 2001, on: http://www.nandotimes.com/technology/story/0,1643,500468156-500716006-503964418-0,00.html illustrates this endless debate, turmoil and lack of consensus about the future directions of WebTV and, the confusion that today exists about how may converge in the future interactive services and media.

Providing On-Line Services on Television or Radio

Unlike the multi-point, to multi-point Web network, radio or television are primarily single-point to multi-point networks. Every user receives the same content from a single broadcasting station. The main problem is to provide "two-way" web-like capabilities in a conventional (non-interactive) broadcast system. Until today, most television and radio receivers were linked to interactive information providers in a very limited way, briefly described hereinafter.

Nowadays, many television and radio broadcasters display an Internet address to make inquiries concerning the program that is retransmitted. Accessing the Internet requires a computer. The user must manually enter the Internet address in the computer. Some other systems allow the exchange of digital information with the viewer by combining this information with the television signal. However, such systems limits the access to a single information source and this source is entirely under the control of the broadcast or cable television operator.

In fact, until recently, there was no way for producers of television or radio programs to create hyperlinks to access complementary information related to a broadcast program. The systems proposed in this regard require the transmission of the complementary information in a secondary signal, concurrently with the retransmission of the main program. The radio auditors or television viewers must be equipped with special decoder circuits for recovering this information. Other proposals are based on transmitting identification of television programs or URLs of hyperlinked information associated to television programs during the vertical blanking interval (VBI) period. Special decoders are also needed to use such methods.

Television closed captions are captions that are hidden in the television video signal, invisible without a special decoder. The place where they are hidden is called line 21 of the vertical blanking interval (VBI). A law in the United States called the Television Decoder Circuitry Act of 1990 requires since July 1993, that all televisions manufactured for sale in the U.S. contain a built-in caption decoder if the television picture tube is 13" or larger. TELETEXT or Supertext captions for the hearing impaired are commonly transmitted by this means. A tutorial of Vertical Blanking Interval (VBI) systems, is available on: http://www.msc-smc.ec.gc.ca/nwsd/awps/vbinfo_e.cfm A specification on how to send URLs over Line21 VBI, has been published by the Computer and Electronics Marketing Association (CEMA), USA.

U.S. Pat. No. 6,125,172 entitled "Apparatus and method for initiating a transaction having acoustic data receiver that filters human voice", U.S. Pat. No. 6,098,106 entitled "Method for controlling a computer with an audio signal" or U.S. Pat. No. 5,119,507 entitled "Receiver apparatus and methods for identifying broadcast audio program selections in a radio broadcast system", disclose systems and methods for embedding information into audio signals.

U.S. Pat. No. 6,097,441 entitled "System for dual-display interaction with integrated television and Internet content", U.S. Pat. No. 6,075,568 entitled "Apparatus of storing URL information transmitted via vertical blanking interval of television signal", U.S. Pat. No. 6,058,430 entitled "Vertical blanking interval encoding of Internet addresses for integrated television/internet devices", U.S. Pat. No. 6,018,768 entitled "Enhanced video programming system and method for incorporating and displaying retrieved integrated Internet information segments", U.S. Pat. No. 5,818,441 entitled "System and method for simulating two-way connectivity for one way data streams", and U.S. Pat. No. 5,761,606, entitled "Media online services access via address embedded in video or audio program" disclose various systems and methods based on the transmission of the information in the vertical blanking interval (VBI) for analog signals, or in dedicated slots for digital signals, according to protocols such as MPEG.

Different systems and methods for embedding hyperlinks or for encoding information into the same images or on selected portions of images have been disclosed for instance in U.S. Pat. No. 6,076,104 entitled "Video data integration system using image data and associated hypertext links", U.S. Pat. No. 6,061,719 entitled "Synchronized presentation of television programming and web content", U.S. Pat. No. 6,018,764 entitled "Mapping uniform resource locators to broadcast addresses in a television signal", U.S. Pat. No. 5,987,509 entitled "System and method for displaying active uniform network resource locators during playback of a media file or media broadcast", U.S. Pat. No. 5,973,685 entitled "Scheme for the distribution of multimedia follow-up information", U.S. Pat. No. 5,841,978 entitled "Network linking method using steganographically embedded data objects", U.S. Pat. No. 5,832,223 entitled "System, method and device for automatic capture of Internet access information in a broadcast signal for use by an Internet access device", U.S. Pat. No. 5,818,935 entitled "Internet enhanced video system", U.S. Pat. No. 5,778,181 entitled "Enhanced video programming system and method for incorporating and displaying retrieved integrated Internet information segments", U.S. Pat. No. 5,262,860 entitled "Method and system communication establishment utilizing captured and processed visually perceptible data within a broadcast video signal", U.S. Pat. No. 5,189,630 entitled "Method for encoding and broadcasting information about live events using computer pattern matching techniques", and U.S. Pat. No. 4,977,455 entitled "System and process for VCR scheduling". In all these patents, the extraction of encoded information requires specialized, dedicated decoders or TV set-top boxes.

Different interaction systems and methods by means of two-way communication protocols for web televisions (WebTVs), interactive television and channel-hyperlinking, using dedicated specialized hardware (e.g., using a television set-top box) and specialized software are disclosed for instance in U.S. Pat. No. 6,073,171 entitled "Two-way communication protocol for a web television", U.S. Pat. No. 5,982,445 entitled "Hypertext markup language protocol for television display and control", U.S. Pat. No. 5,961,603 entitled "Access system and method for providing interactive access to an information source through a networked distribution system", U.S. Pat. No. 5,929,850 entitled "Interactive television system and method having on-demand web-like navigational capabilities for displaying requested hyperlinked web-like still images associated with television content", and U.S. Pat. No. 5,929,849 entitled "Integration of dynamic universal resource locators with television presentation".

A rather different method for enabling an auditor or a viewer to access additional information related to both radio and television programs, based on the general principle of using the reception time of a broadcast program to obtain supplemental information is disclosed in U.S. Pat. No. 5,703,795 entitled "Apparatus and methods for accessing information relating to radio and television programs" (Mankowitz). In order to clearly distinguish, U.S. Pat. No. 5,703,795 from the present invention, as, well as for providing a point of departure for analyzing the other types of systems of the prior art, essential features of U.S. Pat. No. 5,703,795 will be discussed in detail.

Basically, U.S. Pat. No. 5,703,795 discloses and apparatus and method for ordering supplemental information about programs playing at a broadcast receiver. One embodiment is a method for providing information to a user from an information depository. The method includes the steps of reproducing in the vicinity of each of a plurality of users, programs from one of a plurality of broadcasting stations, recording upon command by a user, an identification of a station and a time of a program on the station for which supplemental information is desired by the user, entering the recorded station identification and time into one of a plurality of information exchange terminals, coupling the information exchange terminal to the information depository to transmit information therebetween; and identifying a correspondence between the entered station identification and time and a program in a station log to obtain the desired supplemental information. The method additionally includes the steps of compiling a station log of stations, program times, and program identifiers for programs on the stations and mapping the program identifiers in the log to supplemental information relating to specific programs.

While U.S. Pat. No. 5,703,795 is directed to a system for ordering the user supplemental information from live broadcasts programs, the present invention relates to a system for ordering the user supplemental information from recorded broadcast programs, when the user playbacks said programs.

While U.S. Pat. No. 5,703,795 preferably uses "local times" of transmitters and receivers, the system and method object of the present invention, is based on the use of a common Universal-Time reference for transmitters and recorders, such as for example the Universal Time Coordinated (UTC) time or the Global Positioning System (GPS) time. The principle of the invention is the following: transmitters and recorders (i.e., audio or video cassette recorders), must be synchronized by means of a unique Universal-Time reference and timing system independent of the respective location of each transmitter and each recorder. Otherwise, if a recorder is located far from the transmitter (e.g., on a different time-zone), a system using "local times" wilt fail without the prior re-synchronization of the recorder to the transmitter. To perform this re-synchronization, the recorder must know in advance the time-zone of the transmitter. The problem is that the time-zone of the transmitter is unknown in some cases. A border case for illustrating this difficulty is the example of a mobile user recording broadcast programs from different remote broadcasting stations when flying across different time-zones.

As described in U.S. Pat. No. 5,703,795, transmitters (i.e., broadcasting stations) are responsible of synchronizing receivers, for example, by means of audible DTMF (Dual-Tone Multi Frequency) tones broadcast by a local station at each hour of the day. So users can synchronize their receiver using its internal radio circuit or using another radio for detecting the audible tone and resetting the system clock. Alternatively, U.S. Pat. No. 5,703,795 proposes for synchronizing receivers, to download a synchronizing DTMF tone to the receiver via a telephone link. The proposed synchronization mechanism limits the capability of the receiver to be synchronized "at any moment" with the transmitter, independently of sporadic receptions ("a few times each day", or "hourly") of timing signals sent by the transmitters, or by an Independent timing authority responsible of synchronizing both, transmitters and receivers. The alternative of making a telephone call for transmitting a synchronization signal involves additional complexity and limits the efficiency and usefulness of the system. Also, under certain realistic circumstances, the reception and decoding of audible timing tones may be unreliable and prone to errors. Unlike U.S. Pat. No. 5,703,795, the system and method according to the present application is based on an Universal-Time timing system, preferably the Global Positioning System (GPS) time, for synchronizing transmitters and recorders. The present invention makes possible that both transmitters and recorders are "always" synchronized according to a same reference time, without the need of a human intervention.

In U.S. Pat. No. 5,703,795, there is no precise definition of the notion of "distance" for selecting a program based on the time recorded by the user. Basically, U.S. Pat. No. 5,703,795 describes a system on which a single selection of a program can be made (i.e., a unique "hyperlink" can be activated during a program), based on the user's selection time. On this referenced system programs are sequential and can be activated on non overlapping time intervals, thus the user is forced to act promptly for correctly selecting an interesting item during the program, before the next program could start. If the program that is being received has a very short duration (e.g., 30 seconds), and the user hesitates or delays by any reason the decision to make a selection, a wrong selection may be made. Thus, with this method, a problem occurs if the next program starts before the user selects the previous program.

Unlike U.S. Pat. No. 5,703,795, in the present invention each program comprises one or a plurality of hyperlinks. Each hyperlink in the program is associated with an hyperlink "start time" and an hyperlink "end time", (i.e., an hyperlink becomes "alive" during a finite universal-time interval) and may be recovered and activated only when the user makes a selection during this time interval. This mechanism takes into account the "temporal fuzziness" effects due to delays on selections and variations on program transmission and recording times. Overlaps of time intervals during which the hyperlinks of the "successive programs" are "alive" are defined and implemented. Even when a user makes a "late" selection, it will still be possible to recover the information associated with the desired interesting topic found on the recorded program.

In U.S. Pat. No. 5,703,795, only one information at a time, associated with a single selected program can be retrieved from a single transmitter, content producer or operator. Unlike U.S. Pat. No. 5,703,795, the present invention defines and implements overlaps on time of multiple hyperlinks for the same program. The user can retrieve multiple different data, from different information providers, with a single selection. For example, if a user watches a recorded movie and, at the time of the selection, the user was watching on the TV set a scene played by two actors, by selecting this scene, the user may be "linked" to two different biographies, each one provided by a different Web server (i.e., having different URLs).

Finally, U.S. Pat. No. 5,703,795 basically discloses a proprietary system where information associated with the programs on a broadcast channel is provided by a single source. The information is stored and supplied by a single information provider, such as the broadcast television operator. Unlike U.S. Pat. No. 5,703,795, the present invention discloses an open system for accessing on the Web additional information related to recorded radio or television programs.

As shown in the foregoing discussion, while during the last years, systems have been developed to increase the level of user interaction, and thus, to provide more information and learning and entertainment opportunities, today vast sources of information such as we can find on the Web, still remain inaccessible for traditional broadcast media (i.e., using conventional, one-way, TV and radio broadcast systems, passive TVs and radio receivers and conventional audio and VCR recording and playback equipment).

Therefore, today there is a need to provide new convenient, universal, and easy mechanisms to enable people listening to or watching a program recorded from the radio or the television, to effectively select and access complementary information related to said program and for which they have some interest.

In particular, today there is a need for producers to create hyperlinks, from segments or sequences of information of recorded programs, to relevant data on the Web in such a form that, without physically transmitting these hyperlinks embedded on conventional one-way broadcast signals and thus, without modifying conventional transmitters, receivers or recorders, these hyperlinks can be selected by a radio auditor or a television viewer during the playback of a program, and then be activated for accessing related information or service throughout the Web.

Moreover, there is a need for a system able to operate independently of the relative positions of recorders and transmitters, without having to synchronize recorders with transmitters.

OBJECTS OF THE INVENTION

It is a broad object of the invention to integrate conventional non-interactive recording and playback systems, such as conventional audio and video tape or disk recorders, and interactive computing systems such as Internet and the Web.

It is another object of the invention to enhance the information provided by broadcast program producers with an access to complementary information on the Web.

It is another object of the invention to provide a mechanism for combining the user-friendly experience of audio or video tape or disk recorders with the huge amount of information and services available on the Web.

It is another object of the invention to enable an auditor or a viewer to select in a recorded program, topics that draw his attention and then to easily access information related to those topics in a Web environment.

It is a further object of the invention to enable an auditor or viewer to more conveniently access additional information related to the Information recorded from a conventional broadcast program, without transmitting additional information or modifying conventional broadcast signals and thus, without modifying the conventional media recorder and playback equipment.

It is a particular object of the invention to use indifferently the same method for audio programs or video programs.

SUMMARY OF THE INVENTION

The present invention is directed to a system, method and computer program—as defined in independent claims—for enabling a user (an auditor or a viewer) to access complementary information related to one or a plurality of sequences or topics of interest in a recorded program previously broadcast on the radio or television and played back on a device, such as an audio or video tape or disk recorder/player. The preferred embodiment of the invention relates to a system and method for enabling a person listening to or watching a recorded program, to select one or a plurality of topics drawing his or her attention and for immediately or later on, receiving further information related to these topics from the Word Wide Web. The system is based on the synchronization of local times of transmitters and recorders. The flow of information transmitted, received and recorded is always synchronized, independently of the relative positions of recorders and transmitters. The synchronization is done referring to an absolute or universal time such as the Global Positioning System Time (GPS-time), the Global Orbiting Navigational Satellite System (GLONASS) time or another suitable universal time based on a satellite system. The GPS or GLONASS receivers are integrated or connected to the broadcasting stations. At the receiver side, GPS or GLONASS receivers may be integrated or connected to the audio or video recorders. The system is also based on a plurality of hyperlinks defined during the production and recording of the broadcast program, for given sequences corresponding to particular intervals of time synchronized with the universal (absolute) time. The hyperlinks are associated with the information that is broadcast in the program. They can be selected by users during the playback of the recorded program during predefined intervals of time and activated to access additional information and services.

Further embodiments of the invention are provided in the appended dependent claims.

The present invention discloses a system, method and computer program for use in a user device connected to a network, of retrieving one or a plurality of hyperlinks associated with a recorded program previously broadcast on a channel when said recorded program is played back on a player or recorder device. The method comprises the steps of:
identifying the channel that has previously broadcast the recorded program;
recovering a destination address within the network associated with the identified channel for accessing information related to the one or plurality of hyperlinks defined for the recorded program;
recovering the universal time interval corresponding to the broadcasting of the program on the identified channel;
recovering the universal time corresponding to the start of the broadcasting of the program on the identified channel;
accessing by means of the destination address associated with the identified channel, the information related to the one or plurality of hyperlinks defined for the universal time interval corresponding to the broadcasting of the program on the channel, said information comprising for each hyperlink:
an universal time interval;
a destination address within the network for accessing multimedia information;
computing for each hyperlink, a relative time interval, by subtracting from the universal time interval of each hyperlink, the universal time corresponding to the start of the broadcasting of program on the identified channel;

starting a program timer at the start of the program played back on the player or recorder device;
each time a selection command is received, determining by means of said program timer, the selection time corresponding to the reception of said selection command from the start of the playback;
identifying and retrieving from the program table, the destination address associated with each hyperlink defined for the one or plurality of relative time intervals comprising said selection time.

The foregoing, together with other objects, features, and advantages of this invention can be better appreciated with reference to the following specification, claims and drawings.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

FIG. 1 illustrates how users perceive topics of interest when listening or watching radio or television programs played back on audio or video tape or disk players or recorders.

FIG. 2 illustrates the principle of the invention based on the synchronization of local times of transmitters and recorders according to a same universal time, such as for example, the Global Positioning System (GPS) time.

FIG. 3 shows the main components of the invention.

FIG. 4 illustrates how broadcast programs are synchronized according to the present invention.

FIG. 5 illustrates how hyperlinks become alive during the broadcast of a program, and how several hyperlinks can become alive at the same universal time according to the present invention.

FIG. 6 shows the hyperlinks defined in a recorded program according to the present invention.

FIG. 7 shows how the hyperlinks associated with a recorded program and the corresponding time intervals are stored in a Program Timing File according to the present invention.

FIG. 8 shows an example of a Program Timing File of a recorded program according to the present invention.

FIG. 9 illustrates the steps of the preferred method for creating Program Timing Files on Channel Information Servers.

FIG. 10 illustrates the steps of the method of generating an Hyperlink Table on a Channel Information server using the Program Timing File when a program is broadcast according to the present invention.

FIG. 11 shows how relative time intervals of hyperlinks of a recorded program are transformed in absolute time intervals (also called universal time intervals) in an Hyperlink Table when the recorded program is broadcast according to the present invention.

FIG. 12 shows an example of Hyperlink Table in the Channel Information Server of a broadcast program according to the present invention.

FIG. 13 shows the steps of the method for recording a broadcast program on an audio or video tape or disk recorder.

FIG. 14 shows the steps of the method for retrieving from a Channel Information Server hyperlinks information and for generating a Program-Table of a recorded program on a user's device according to the present invention.

FIG. 15 shows how the user creates a Program-Table for a recorded program by specifying the name of the program and the universal time interval corresponding to the broadcasting and recording of the program according to the present invention.

FIG. 16 shows how a user's device sends to the Channel Information Server the universal time interval corresponding to the broadcasting and recording of the program according to the present invention.

FIG. 17 shows how a user's device retrieves from the Channel Information Server and stores on the Program-Table the names, universal time intervals and URLs of hyperlinks that were defined for the universal time interval corresponding to the broadcasting and recording of the program.

FIG. 18 shows how universal times associated with hyperlinks are transformed to relative times (in seconds) by subtracting from the universal time intervals, the universal time corresponding to the start of the recording.

FIG. 19 shows the steps of the method for playing a recorded program and for accessing additional information from said recorded program according to the present invention.

FIG. 20 shows how a user loads a video tape or disk on the player/recorder device and selects on his user device, the Program-Table of this program by means of a menu according to the present invention.

FIG. 21 shows how a user starts to play back a recorded program on his player/recorder device and, at the same time, resets the program timer on his user device according to the present invention.

FIG. 22 shows how a user while playing the recorded program, selects a topic of interest by entering a command on the user device and how the selection time is read on the program timer according to the present invention.

FIG. 23 shows how using the selection time, an hyperlink is identified and retrieved from the Program-Table and how this hyperlink is activated to access a server according to the present invention.

FIG. 24 shows how the information and/or service related to the selected topic of interest is retrieved from the server and displayed on the user device according to the present invention.

PREFERRED EMBODIMENT OF THE INVENTION

As shown in FIG. 1, the present invention discloses a system and a method for enabling a person (100) to record a broadcast program, such as a radio or television program (103), on a recording device (104) and, at a later time, to access additional information (101) (102) related to said recorded program (103).

As shown in FIG. 2, the invention is based on the synchronization of the transmitters (201) and recorders (203) according to a same universal-time (204) (205). The flow of information transmitted and recorded is always synchronized, independently of the relative positions of transmitters (201) and recorders (203) according to an universal time such as the Global Positioning System Time (GPS-time), the Global Orbiting Navigational Satellite System (GLONASS) time or another suitable universal time based on a satellite system. The GPS or GLONASS receivers (204) are connected to or integrated in the broadcasting stations (201). At the recorders side, GPS or GLONASS receivers (205) may be connected to or integrated in audio/video recording devices (203). Broadcast programs (208) are recorded on recording devices (203) which are synchronized (205) with the broadcasting stations (201). The start (respectively the end) of the broadcasting and the start (respectively the end) of the recording are synchronized according to the same the same universal time (204).

As shown in FIG. 3, the preferred embodiment of the invention gives the possibility to an auditor or a viewer (301) of an audio or video program (302) that has been recorded on a recording device (303) from a radio or television channel (305), to select on his user device (311) one or a plurality of topics drawing his attention (304), to access immediately or later on, additional information or services related to these topics (304) on the Word Wide Web (309) (310), and to display this additional information or execute these services on his user device (311).

FIG. 4 shows that the invention is based on a system in which programs (401) that are broadcast on a channel are synchronized according to an universal time.

FIG. 5 shows how the hyperlinks (502) are defined for a broadcast program (501). Hyperlinks are alive during predefined universal time, intervals (503) and a plurality of hyperlinks can be alive at the same time (504, 505).

FIG. 6 shows how the hyperlinks are defined in a recorded program during the interval of time corresponding to the start and the end of the recording (Trecord start–T record stop) (601) (602).

During transmission of a program, the broadcasting station or transmitter (305) updates a database on a Channel Information Server (306) (i.e., a server linked to the transmitter or broadcasting station). This database comprises universal time intervals (for instance GPS-time intervals) during which hyperlinks between the broadcast program and URLs (Uniform Resource Locators) of Web pages are defined.

Universal Timing Systems

Tuning sequences, independent of locations of transmitters and receivers, can be derived from an absolute timing reference such as, for example, the Global Positioning System (GPS) time or the Universal Time Co-ordinated (UTC) time (also known today as GMT and ZULU time).

To transmit precise timing signals, the GPS uses 24 satellites in 55° inclined orbits 10,000 miles above the earth. These timing signals are used by any GPS receiver anywhere on the earth to determine its position. A 1575 MHz transmission carries a 1-MHz bandwidth phase-modulated signal named the clear acquisition (C/A) code. When a GPS receiver receives this signal from at least three GPS satellites, it can determine its own latitude and longitude with an accuracy of about 30 meters. Apart the determination of geographical positions, the GPS is today widely used for distributing Precise Time and Time Interval (PTTI). The system uses time of arrival (TOA) measurements for determining a position. A precisely timed clock is not essential for the user because time is obtained in addition to position by the measurement of the TOA of four satellites simultaneously in view. If the altitude over sea level is known, three satellites are sufficient. If the user is stationary at a known position then, in principle, the time can be obtained by the observation of a single satellite. Information about the GPS time service is supplied by the "Time Service Department", U.S. Naval Observatory, Washington, D.C., at: http://tycho.usno.navy.mil/

GPS is today the world's principal supplier of accurate time. It is used extensively both as a source of time and as a means of transferring time from one location to another.

Three kinds of time are available from GPS: GPS time, UTC as estimated and produced by the United States Naval Observatory, and the times from each free-running GPS satellite's atomic clock. The Master Control Station (MCS) at Falcon Air Force Base near Colorado Springs, Colo., gathers the GPS satellites' data from five monitor stations around the world. A Kalman filter software program estimates the time error, frequency error, frequency drift and Keplerian orbit parameters for each of the satellites and its operating clock. This information is uploaded to each satellite so that it can be broadcasted in real time. This process provides GPS time consistency across the constellation to within a small number of nanoseconds and accurate position determination of the satellites to within a few meters.

The second universal time standard, Universal Time Coordinated (UTC), introduces leap seconds to remain synchronized with the rotation of the earth. In order to provide an estimate of UTC time derivable from a GPS signal, a set of UTC corrections is also provided as part of the GPS broadcast signal. This broadcast message includes the time difference in whole seconds between GPS time and UTC. This complicates software that deals with the smooth flow of data streams or calculates the times between data samples. GPS Time is preferred in this invention as this system avoids the introduction of leap seconds and is easily related to UTC. Information about UTC (GMT) time service can be found on: http://time.greenwich2000.com/

GPS Receivers

A Direct-to-Digital GPS Receiver is described in the following Web site: http://w3.research.ibm.com/present/gto200038.htm.

This is an example of a tiny low cost chip which can integrate GPS into anything (e.g., a PDA, a mobile phone, a wearable computer, a video camera, an audio or video cassette recorder, . . . ). This receiver has been jointly developed between IBM and Leica. The high speed analog capabilities of SiGe technology, when integrated with the CMOS technology, allows the integration of this single chip directly to a digital GPS (Global Positioning System) receiver. GPS derived position information is finding a multitude of diverse applications: from mapping and surveying to vehicle tracking to 911 cell phone caller location to automated farm equipment to even robotics golf carts . . . . This receiver chip reduces the radio dimensions and complexity. There are no analog mixer stages, nor costly discrete components (such as high quality filters) that conventional two stage analog down conversion would have required. Instead, the incoming GPS signal is literally digitized right at the antenna, then filtered digitally in a CMOS based chip. This direct digitization is made possible by the ability of SiGe technology to run at high speed on very little power, and the core of this technology is a SiGe based Analog to Digital Data Converter.

According to the present invention GPS or GLONASS receivers (204) (205) must be integrated in or connected to the transmitters on the broadcasting stations (201) and to audio or video recording devices (203) used to record and playback radio or television programs. The universal timing signals that are received from GPS or GLONASS satellites, are used to initialize and synchronize the internal electronic clocking systems on the recording devices (203) according to the same universal time. If the recording devices are permanently installed inside buildings, to receive timing signals from GPS or GLONASS satellites, they must be connected to an external antenna (e.g., antenna installed on the roof of the building). If the recording devices are portable or in-vehicle mounted, satellite signals will be normally received when the user is out of doors or is traveling. During the periods on which GPS or GLONASS satellites are out of sight (e.g., when recording devices are inside buildings or not connected to an external antenna), and no timing signals are thus received from those satellites, timing information must be continuously derived from autonomous electronic clocking systems of the recording devices. Depending on the drift of the clocking systems set up in the recording devices, and to keep enough timing precision and to be sure that recording devices are synchronized with broadcasting stations at the same universal time, a more or less frequent periodic reception of satellite signals must be performed.

Time Stamping Multimedia Data into Programs

FIG. 7 illustrates how time stamps (701) are commonly used at the post-production of a program (700) to encode multimedia timing information embedded with audio and video streams. Time stamps on program data streams enable time information to be associated with events on audio, video or other time dependent data to broadcast. Time stamps are used within current video tape or disk formats and DAT formats (files *.DAT are plain text—ASCII—files that represent digital signals).

Commonly stamps embedded in a multimedia data stream are used to meter the playback rate to be sure that the stream runs at the desired rate. Also, during production or edition of programs, if several streams are independently recorded (e.g., video and audio), and need to be edited, to be integrated on a unique stream, then certain operations such as cuts or insertions may be required at certain recorded times on each stream. The use of time stamps (also named "mark keys") embedded in multimedia streams provides markers for controlling such operations.

In fact, time coding is a fundamental aspect of the today post-production world. In simple terms, a time code is a number assigned to each video frame, so that each frame can be uniquely identified. In some systems, the data is coded in binary-coded decimal digits in the form HH:MM:SS:FF (hours:minutes:seconds:frames). In video post-production, an edit is denoted by an "in" point (the time code of the first frame to be recorded) and an "out" point (the time code of the first frame beyond the recording).

A system for time coding multimedia streams is provided by Aaton, a company with headquarters in Grenoble, France, and an innovator of motion-picture camera equipment. When using a camera equipped with Aaton time-code electronics and an audio time-code recorder and related hardware, a true time and date is recorded. A unique stamp or code (AatonCode) is attached permanently to the image and sound originals. The non-repeatability of the code makes possible the association of a single piece of audio with a particular image. In post-production, the Aaton's system is used as a film-code reader, transfer database and management system for the telecine. The post-production reads the codes off the negative during film-to-tape transfer and translates the data from each film frame to a field of video into a frame-accurate description. By reading this real-time address and simultaneously feeding its audio time-code equivalent to an audio-chasing machine, the system can perform nonstop automatic synchronizing of a DAT or quarter-inch field audio during the transfer. In post-production, the use of AatonCode and the associated database reduces event-logging time for the editor's assistant. Information about the Aaton's post-production system and products can be found on the official page at: http://www.aaton.com/

By means of the here above described systems or by anyone of several other systems today in use for the post-production of multimedia data, the timing information (e.g., time stamps) of a produced program (700) can therefore be used to encode and record time intervals (701) in a Program Timing File (702). According to the present invention, the Program Timing File of a produced program comprises timing information (for instance, times elapsed relative to the program's start time (t=0) (704)) related to different sequences of the program.

Hyperlinked Time Intervals

An hyperlinked word (or image) in an HTML document can be defined as a range of letters (or pixels) that can be activated with a pointing device to access a Web page. For information transmitted as a real-time sequence of items, such as those found on a broadcast program, the concept of "hyperlinked time Interval" is similar to the concept of hyperlinked word or image. FIG. 7 shows how the present invention defines for a particular radio or television program/hyperlinks (705) related to specific time intervals the hyperlink destination address (i.e., the URL) where the hyperlinked information or service can be found.

FIG. 8 is an example (also shown in the next table) of the Program Timing File (801) for a television program entitled "Early British Kingdoms" (808). This program has a duration of 4.587 seconds (802). This file teaches that, for example, the hyperlink named "Ceredigion" (803) can be activated 1.535 seconds (804) after the program starts and can be activated until second 2.092 (805). If a user plays this recorded program and selects the topic shown during this (relative) time interval, the hyperlink to the URL address (806): http://freespace.virgin.net/david.ford2/ceredigion.html
will be selected. This example also shows that if, for instance, a user selects a topic 1.790 seconds after the program starts playback, then hyperlinks: "Ceredigion" at URL: http://freespace.virgin.net/david.ford2/ceredigion.html and "Mabinogion" at URL: http://www.cyberphile.co.uk/~taff/taffnet/mabinogion/mabinogion.htm will be both selected.

| PROG.TIME 4.587 segs. | | PROGRAM NAME: "Early British Kingdoms" | PROGRAM URL: http:/freespace.virgin.net/ |
|---|---|---|---|
| From (secs): | To (secs): | Link Name: | URL: |
| 0 | 596 | Buellt & Gwerthrynion | http://freespace.virgin.net/david.ford2/buellt.html |
| 536 | 721 | Caer-Baddan (Bath) | http://freespace.virgin.net/david.ford2/south.html#Gloui |
| 566 | 1 715 | Caer-Celemion | http://freespace.virgin.net/david.ford2/vortigern.html |
| 1 535 | 2 092 | Ceredigion | http://freespace.virgin.net/david.ford2/ceredigion.html |
| 1 535 | 2 452 | Mabinogion | http://www.cyberphile.co.uk/-taff/taffnet/mabinogion/mabinogion.htm |
| 2 392 | 3 597 | Avalon | http://freespace.virgin.net/david.ford2/avalon.html |
| 3 537 | 4 037 | Afallach | http://freespace.virgin.net/david.ford2/gods.html#Afallach |
| 3 720 | 3 973 | Beli Mawr | http://freespace.virgin.net/david.ford2/gods.html#Beli |
| 3 720 | 3 973 | St. Joseph of | http://freespace.virgin.net/david.ford2/joseph.html |
| 3 840 | 4 259 | The Kings of | http://freespace.virgin.net/david.ford2/dumnonia.html |
| 4 199 | 4 587 | Eudaf Hen & Conan | http://freespace.virgin.net/david.ford2/eudanc.html |

(701). Each hyperlink (705) can be activated during the time interval (701) for which said hyperlink has been defined. To that aim the system uses the Program Timing File (702) associated with the produced program (700), for storing the different hyperlinked time intervals (701) comprised in the radio or television program. The hyperlinked time intervals associate time intervals (t_init, t_end) (701) with multimedia information or services (705) located on servers (310) accessible through the Internet (309) or through another network.

Program Timing File

In the preferred embodiment of the invention, hyperlinked time intervals (701) are encoded in the Program Timing File (702) in relative time units, such as seconds, elapsed from the beginning of the program (t=0) (704). Thus, for each hyperlink (705) (e.g., hyperlink 6) "t_init" indicates the number of seconds elapsed from the time at which the program starts to play (t=0) to the time at which the hyperlink becomes alive, and "t_end" indicates the number of seconds elapsed from the time at which program starts to play (t=0) to the time at which the hyperlink is no more alive. FIG. 7 also shows how time intervals (701) associated with the different hyperlinks (705) may overlap and hence how several hyperlinks may be alive simultaneously.

The Program Timing File of a post-produced program encodes, for each hyperlink:
the hyperlink time interval (t_init, t_end), in time units relative to the start of the program,
the hyperlink name or short description, and Method for Creating Program Timing Files on Servers FIG. 9 shows a method for creating a Program Timing File (702) for a post-produced program and for defining in this Program Timing File, hyperlinks (705) between this program (700) (tike the TV movie entitled "Early British Kingdoms"), and one or a plurality of servers (310) (i.e., Web servers) connected to a network (309) (i.e., to the Internet Network). Said hyperlinks, when selected by auditors or viewers, give access on these servers (310), to multimedia information or services (i.e., Web pages) related to topics (304) perceived as interesting by these auditors or viewers listening or watching the program recorded from the radio or television. The method of creating the Program Timing File for a program comprises the steps of:

during the production or edition of the program (700):
- (901) selecting one or a plurality of relevant topics or subjects (807) for which hyperlinks (806) must be created;
- (902) creating a Program Timing File (801) for the program;
- defining hyperlinks in the Program Timing File between the selected topics (807) and multimedia information or services located on one or a plurality of servers connected to a network, said step comprising the further steps of:
  for each one of the selected topics or subjects (803):
  - (903) assigning a name or a description (803) (preferably a brief description);
  - (904) assigning a destination address (806) (for instance the URL) within the network (309) to access the desired multimedia information or service;

(905) assigning a time interval (t_init, t_end) (804) (805), preferably in time units (e.g., seconds) elapsed from the program start time (t=0), during which it will be possible to retrieve the hyperlink;

(906) storing in the Program Timing File (801) (702) the assigned name (or description) (803), the destination address (806) and the hyperlink time interval (804) (805).

once hyperlinks have been defined in the Program Timing File:

(907) storing the Program Timing File (801) in the Channel Information Server (306) of the broadcasting station (305).

Method for Generating on Servers Hyperlink Tables from Program Timing Files

When a program (208) is retransmitted on a channel (209) by a broadcasting station (201), the relative time-intervals (804) (805) of hyperlinks (806) comprised in the Program Timing File (801) on the Channel Information Server (206) are transformed in absolute time intervals (or universal-time intervals) using an universal-time provided by a GPS receiver (204) or by any other suitable universal-time device integrated or connected to the broadcasting station (201). The resulting table, called Hyperlink Table, is then stored in a database on the Channel Information Server (206) so that it can be accessed later by the auditors and viewers receiving and recording the broadcast program (208). The preferred method of creating an Hyperlink Table in the Channel Information Server (206) basically comprises the step of transforming the relative time intervals of the hyperlinks comprised in the Program Timing File into absolute time intervals when the program is broadcast. More particularly the method, shown in FIG. 10, comprises the steps of:

(1001) retrieving the Program Timing File (801) of the program to be broadcast;

(1002) determining by means of an universal-time device (204) (e.g., a GPS receiver) integrated in or connected to, the broadcasting station (201), the universal time (date and time) corresponding, to the start of the program broadcasting;

(1003) computing absolute time intervals (universal-time intervals) by adding to the (relative) time-intervals (804) (805) of hyperlinks comprised in the Program Timing File (801), the universal time corresponding to the start of the program broadcasting;

(1004) storing the resulting Hyperlink Table in a database in the Channel Information Server (206). In a preferred embodiment, the Channel Information Server comprises the Program Timing Files and the Hyperlink Tables of all hyperlinked programs broadcast on the channel (209);

(1005) broadcasting the program (208) on the channel (209).

FIG. 11 illustrates how, by means of the present method when the transmission starts, the relative time intervals associated with the hyperlinks in the Program Timing File are transformed to universal-time intervals (absolute time intervals) in the Hyperlink Table.

The next table, also shown in FIG. 12, shows the Hyperlink Table that is generated on the Channel Information Server (206) from the Program Timing File shown in FIG. 8 (and on the herein above table), when the broadcasting station (201) starts the transmission of the movie entitled "Warty British Kingdoms" at universal-time (1203): 12/05/2000 14:10:51.

| | | PROGRAM NAME: "Early British Kingdoms" | PROGRAM URL: http://freespace.virgin.net/ |
|---|---|---|---|
| FROM: | TO: | LINK NAME: | URL: |
| Dec. 5, 2000 14:10:51 | Dec. 5, 2000 14:20:05 | Buellt & Gwerthrynion | http://freespace.virgin.net/david.ford2/buellt.html |
| Dec. 5, 2000 14:19:05 | Dec. 5, 2000 14:22:52 | Caer-Baddan (Bath) | http://freespace.virgin.net/david.ford2/south.html#Gloui |
| Dec. 5, 2000 14:20:17 | Dec. 5, 2000 14:39:26 | Caer-Celemion (Silchester) | http://freespace.virgin.net/david.ford2/vortigern.html |
| Dec. 5, 2000 14:36:26 | Dec. 5, 2000 14:45:43 | Ceredigion | http://freespace.virgin.net/david.ford2/ceredigion.html |
| Dec. 5, 2000 14:36:26 | Dec. 5, 2000 14:51:43 | Mabinogion | http://www.cyberphile.co.uk/-taff/taffnet/mabinogion/mabinogion.htm |
| Dec. 5, 2000 14:50:43 | Dec. 5, 2000 15:10:48 | Avalon | http://freespace.virgin.net/david.ford2/avalon.html |
| Dec. 5, 2000 15:09:48 | Dec. 5, 2000 15:18:08 | Afallach | http://freespace.virgin.net/david.ford2/gods.html#Afallach |
| Dec. 5, 2000 15:12:51 | Dec. 5, 2000 15:16:22 | Beli Mawr | http://freespace.virgin.net/david.ford2/gods.html#Beli |
| Dec. 5, 2000 15:12:51 | Dec. 5, 2000 15:16:22 | St. Joseph of Arimathea | http://freespace.virgin.net/david.ford2/joseph.html |
| Dec. 5, 2000 15:14:51 | Dec. 5, 2000 15:20:08 | The Kings of Dumnonia | http://freespace.virgin.net/david.ford2/dumnonia.html |
| Dec. 5, 2000 15:19:08 | Dec. 5, 2000 15:25:36 | Eudaf Hen & Conan Mer | http://freespace.virgin.net/david.ford2/eudanc.html |

Method for Recording a Broadcast Program

FIG. 2 shows the system according with the present invention for recording a program (208) broadcast on a channel (209). As shown in FIG. 13, the method for use in a recording device (203) comprising or connected to a universal-timing device (205), comprises the steps of:

(1301) selecting a channel (209) and a universal-time interval (207) (i.e., selecting the universal-time corresponding to the start of the recording and the universal-time corresponding to the end of the recording or, alternatively, selecting the universal-time corresponding to the start of the recording and the duration of the recording);

(1302) setting on the recording device (e.g., a VCR) (203) said selected channel (209) and said selected universal-time interval (207);

(1303) recording on said recording device (203) the program (208) broadcast by the selected broadcast channel (209) during the selected universal-time interval (207).

Channel Table

As a preliminary step for enabling the user (301) to select topics of interest (304) from programs recorded from different channels (306), a Channel Table, like the one illustrated hereinafter, must be created beforehand on the user device and must be filled with the information pertaining to all channels that the user knows to be usable to implement the system and method of the invention. Basically, a Channel Table stores the information needed for accessing from a user device (311) a plurality of Channel Information Servers (306) throughout a communication network (309). This Channel Table comprises:
- a list of channel numbers and, for each channel number:
  - the broadcasting station name, and
  - the network address (for instance the URL) of the Channel Information Server (306) associated with said channel.

The information on the Channel Table has been previously recorded by the user and can be provided by anyone of the many today available information sources (e.g., by the same TV or radio operators, from newspapers, the Web, . . . ).

| CHANNEL: | BROADCAST STATION: | CHANNEL INFORMATION SERVER URL: |
|---|---|---|
| 03 | RNF | http:/www.radio_nf_info.com |
| 25 | TV2 | http:/www.tve2_link.com |
| 17 | TV5 | http:/www.tve5_link.com |
| 33 | CNN-NEWS | http:/www.cnn_news_link.com |
| 72 | NBC | http:/www.nbc_link.com |

Method for Generating a Program-Table on a User Device

FIG. 14 illustrates the method according to the present invention for retrieving from a Channel Information Server (306) associated with a channel, the hyperlinks associated with a program recorded from said channel, and for storing these hyperlinks in a Program-Table (313). The method, for use in a user device (311) connected to a network (309), comprises the steps of:
(1401) selecting from the Channel Table, the channel that has broadcast the recorded program;
(1402) assigning a name to the recorded program;
(1403) creating a new Program-Table for the recorded program and storing in said Program-Table the assigned program name and the universal time interval (start time and end time, or start time and duration . . . ) corresponding to the broadcasting and recording of the program;
(1404) accessing the Channel Information Server of the selected channel and sending the universal time interval corresponding to the broadcasting and recording of the program;
(1405) identifying on the Channel Information Server, the one or plurality of hyperlinks defined for an universal time interval corresponding to the broadcasting and recording of the program;
(1406) retrieving from the Channel Information Server and storing in the Program-Table the information associated with said hyperlinks (i.e., for each hyperlink, the universal-time interval, the name or description and the URL);
(1407) computing for all hyperlinks in the Program-Table, relative time intervals (i.e., time intervals computed from the start of the recorded program), by subtracting from the universal (absolute) time intervals of hyperlinks, the universal (absolute) time corresponding to the start of the program on the broadcast channel.

FIGS. 15, 16, 17 and 18 illustrate the different steps of the present method.

FIG. 15 shows how the user, after having recorded a broadcast program creates on his user device (1501), a new Program-Table (1502) for the selected broadcast channel (1503) (e.g., "Channel 25"). In particular, the user enters the assigned program name (1506) (e.g., "Early British Kingdoms"), and the universal time interval corresponding to the broadcasting and recording of the program (1507) (FROM DATE/TIME: 12/05/2000 14:10:00 TO DATE/TIME: 12/05/2000 15:20:00). The information that must be stored in the header of the new Program-Table, is retrieved from the Channel-Table. This information comprises:
- the channel number (1503) (e.g., "Channel 25"),
- the broadcasting station name (1504) (e.g., TV-2), and
- the network address (e.g., http:/www.tve2_link.com) of the Channel Information Server (1505) associated with said channel.

FIG. 16 shows how the user device (1601), using the network address (1604) (e.g., http:/www.tve2_link.com) of the Channel Information Server (1605) as destination address, sends the universal time interval (1603) of the recorded program (e.g., FROM: 12/05/2000 14:10:00, TO: 12/05/2000 15:20:00).

FIG. 17 shows how, the Channel Information Server (1702) retrieves from the Hyperlink Table, sends back to the user device (1701) and stores on the Program-Table (1703), the information related to the hyperlinks that were defined ("alive") at the selected universal time interval of the recording. This figure also shows how the Program-Table (1703) is updated on the user device (1701) with the hyperlinks information (1704) (i.e., for each hyperlink, the hyperlink universal-time interval, name, and URL) retrieved from the Channel Information Server (1702).

FIG. 18 shows how universal-time intervals of hyperlinks recorded in the Program-Table on the user device (1801) are transformed in relative time intervals (in seconds from the start of the program) by subtracting the universal time corresponding to the start of the recording (1802). The resulting Program-Table (1803) including the relative time intervals associated with hyperlinks is shown on the screen of the user device (1801).

Method for Playing a Recorded Program and for Accessing Information Related to Said Recorded Program By means of the method previously described, the user (301) retrieves from the Channel Information Server (306) of the selected channel, the information required to fill in and complete the Program-Table (313) of the recorded program (302) previously broadcast on this channel (for example the television program entitled "Early British Kingdoms"). Once the information has been retrieved from the Channel Information Server (306), the recorded program can be played (normally on the same recording device (303)). The user can then access additional information from his user device (311), while listening or watching the recorded program. To select topics of interest, the auditor or viewer, as illustrated in FIG. 19:
(1901) chooses a recorded program on his radio or video tape or disk player/recorder device and selects the corresponding Program-Table on his user device;

(1902) plays the recorded program on the player/recording device and, at the same time, resets a program-timer on the user device;

(1903) listens to or watches the program on the player/recorder;

(1904) perceives (listens to or watches) in the program a topic of interest for which he would like to have additional information and/or an associated service;

(1905) selects the interesting topic by entering a selection command on the user device;

(1906) determines by means of the program-timer the selection time;

(1907) selects in the Program-Table an hyperlink corresponding to the selection time;

(1908) activates the hyperlink using a browser program on the user device;

(1909) accesses on a server connected on the network, the hyperlinked information and/or service using the destination address associated with the selected hyperlink;

(1910) retrieves from the accessed server on the network the information and/or service; and (1911) displays the retrieved information and/or service using the browser program on the user device.

FIGS. 20, 21, 22, 23 and 24 illustrate the different steps of the present method.

FIG. 20 illustrates how the user loads a recorded program (2003) (for example the television program entitled "Early British Kingdoms") on the player/recorder device (2002) and selects from a menu displayed on the screen of his user device (2001) the Program-Table corresponding to this program (2004).

FIG. 21 shows how the user starts the recorded program (2103) on the player/recorder device (2102) and, at the same time, resets (i.e., initializes) the program timer (2105) on the user device (2101). The program timer (2105) counts the time elapsed tp (i.e., seconds) from the start of the program.

FIG. 22 shows how the user (2200), while watching the recorded program (2203) (e.g., the television program entitled "Early British Kingdoms"), on the recording device (2202), has his attention drawn by topic of interest (2206), and how he immediately selects this topic by entering a selection command (2204) (e.g., by pressing a reserved key) on the user device (2201). This figure also shows how the selection time tp (2205) (i.e., the seconds elapsed from the beginning of the program to the moment at which the user has made this selection), is read on the program timer (2207).

FIG. 23 shows how from the selection time tp (for instance, tp=3920 secs) read on the program timer (2303), an hyperlink (2302) (e.g., "Afallach") can be identified and retrieved from the Program-Table (2304) located on the user device (2301) and how this hyperlink (e.g, URL: http://freespace.virgin.net/david.ford2/gods.html#Afallach) is activated to access information and/or service on a server (2306) (e.g., freespace.virgin.net) on the network (2305) (preferably the internet network).

Finally, FIG. 24 shows how, the information and/or service (2402) related to the selected topic (e.g., "Afallach") is retrieved by the user device (2401) from the server (2404) (e.g., freespace.virgin.net) connected to the network (2405) (preferably the Internet network) and displayed (or played) on the screen of the user device by means of a browser program (2403).

While the invention has been particularly shown and described with reference to a preferred embodiment, it will be understood that various changes in form and detail may be made therein without departing from the spirit, and scope of the invention.

The invention claimed is:

1. A method comprising:

transmitting, by a server to a client device, a plurality of program tables, each program table in the plurality relating to a previously recorded broadcast, each program table comprising a plurality of information relating to the previously recorded broadcast, the plurality of information comprising broadcast channel, broadcast station, URL of channel information server, program name, and universal time of recording interval;

receiving, by the server from the client device, selection of a program table in the plurality of program tables, the selection of the program table causing the corresponding previously recorded broadcast to start playing;

transmitting, by the server to the client device, instructions to reset a program timer on the client device when the corresponding previously recorded broadcast program starts playing;

receiving, by the server from the client device, a selection of a topic;

determining, by the server, a selection time from the program timer;

retrieving, by the server, additional information about the selected topic from a web page corresponding to the selection time; and transmitting, by the server to the client device for display, the additional information.

2. The method of claim 1, wherein the universal time of recording interval comprises a start time and an end time corresponding to broadcasting and recording of the broadcast program.

3. The method of claim 1, further comprising identifying one or more hyperlinks defined for the universal time of recording interval.

4. The method of claim 3, further comprising storing the one or more hyperlinks in the program table.

5. The method of claim 4, further comprising computing, for the one or more hyperlinks, time intervals computed from a start of the recorded program by subtracting, from the universal time of recording interval, a universal absolute time corresponding to a start of the broadcast program on the broadcast channel.

6. The method of claim 1, wherein the universal time of recording interval is transformed into a relative time interval by subtracting the universal time corresponding to a start of the recording from the universal time of recording interval.

7. The method of claim 4, wherein the determining of the selection time further comprises selecting, by the server, a hyperlink corresponding to the selection time from the program table.

8. A system comprising:

a processor;

a storage medium for tangibly storing thereon program logic for execution by the processor, the program logic comprising:

program table transmitting logic executed by the processor for transmitting, to a client device, a plurality of program tables, each program table in the plurality relating to a previously recorded broadcast, each program table comprising a plurality of information relating to the previously recorded broadcast, the plurality of information comprising broadcast channel, broadcast station, URL of channel information server, program name, and universal time of recording interval;

program table selection receiving logic executed by the processor for receiving, from the client device, selection of a program table in the plurality of program tables, the selection of the program table causing the corresponding previously recorded broadcast to start playing;

program timer reset instruction transmitting logic executed by the processor for transmitting, to the client device, instructions to reset a program timer on the client device when the corresponding previously recorded broadcast program starts playing;

topic selection receiving logic executed by the processor for receiving, from the client device, a selection of a topic;

selection time determining logic executed by the processor for determining a selection time from the program timer;

information retrieving logic executed by the processor for retrieving additional information about the selected topic from a web page corresponding to the selection time; and additional information display logic executed by the processor for transmitting, to the client device for display, the additional information.

9. The system of claim 8, wherein the universal time of recording interval comprises a start time and an end time corresponding to broadcasting and recording of the broadcast program.

10. The system of claim 8, further comprising hyperlink identifying logic executed by the processor for identifying one or more hyperlinks defined for the universal time of recording interval.

11. The system of claim 10, further comprising storing logic executed by the processor for storing the one or more hyperlinks in the program table.

12. The system of claim 11, further comprising computing logic executed by the processor for computing, for the one or more hyperlinks, time intervals computed from a start of the recorded program by subtracting, from the universal time of recording interval, a universal absolute time corresponding to a start of the broadcast program on the broadcast channel.

13. The system of claim 8, wherein the universal time of recording interval is transformed into a relative time interval by subtracting the universal time corresponding to a start of the recording from the universal time of recording interval.

14. The system of claim 11, wherein the selection time determining logic for determining the selection time further comprises hyperlink selecting logic executed by the processor for selecting a hyperlink corresponding to the selection time from the program table.

15. A non-transitory computer readable storage medium comprising computer program code for execution by a processor, the computer program code comprising instructions for:

transmitting, by the processor to a client device, a plurality of program tables, each program table in the plurality relating to a previously recorded broadcast, each program table comprising a plurality of information relating to the previously recorded broadcast, the plurality of information comprising broadcast channel, broadcast station, URL of channel information server, program name, and universal time of recording interval;

receiving, by the processor from the client device, selection of a program table in the plurality of program tables, the selection of the program table causing the corresponding previously recorded broadcast to start playing;

transmitting, by the processor to the client device, instructions to reset a program timer on the client device when the corresponding previously recorded broadcast program starts playing;

receiving, by the processor from the client device, a selection of a topic;

determining, by the processor, a selection time from the program timer;

retrieving, by the processor, additional information about the selected topic from a web page corresponding to the selection time; and transmitting, by the processor to the client device for display, the additional information.

16. The medium of claim 15, wherein the universal time of recording interval comprises a start time and an end time corresponding to broadcasting and recording of the broadcast program.

17. The medium of claim 15, further comprising identifying one or more hyperlinks defined for the universal time of recording interval.

18. The medium of claim 17, further comprising storing the one or more hyperlinks in the program table.

19. The medium of claim 18, further comprising computing, for the one or more hyperlinks, time intervals computed from a start of the recorded program by subtracting, from the universal time of recording interval, a universal absolute time corresponding to a start of the broadcast program on the broadcast channel.

20. The medium of claim 17, wherein the universal time of recording interval is transformed into a relative time interval by subtracting the universal time corresponding to a start of the recording from the universal time of recording interval.

* * * * *